United States Patent
Otsu et al.

(10) Patent No.: US 11,685,807 B2
(45) Date of Patent: Jun. 27, 2023

(54) RESIN COMPOSITION, CURED PRODUCT, LAMINATE, AND ELECTRONIC MEMBER

(71) Applicant: DIC Corporation, Tokyo (JP)

(72) Inventors: Masato Otsu, Chiba (JP); Kazuo Arita, Chiba (JP)

(73) Assignee: DIC Corporation, Tokyo (JP)

( * ) Notice: Subject to any disclaimer, the term of this patent is extended or adjusted under 35 U.S.C. 154(b) by 226 days.

(21) Appl. No.: 17/253,106

(22) PCT Filed: Jul. 30, 2019

(86) PCT No.: PCT/JP2019/029769
§ 371 (c)(1),
(2) Date: Dec. 16, 2020

(87) PCT Pub. No.: WO2020/059305
PCT Pub. Date: Mar. 26, 2020

(65) Prior Publication Data
US 2021/0269583 A1 Sep. 2, 2021

(30) Foreign Application Priority Data
Sep. 21, 2018 (JP) .............................. 2018-177360

(51) Int. Cl.
*C08G 59/24* (2006.01)
*C08G 59/32* (2006.01)
*C08L 63/00* (2006.01)
*B32B 15/092* (2006.01)
*B32B 27/38* (2006.01)
*C08G 59/40* (2006.01)

(52) U.S. Cl.
CPC .......... *C08G 59/245* (2013.01); *B32B 15/092* (2013.01); *B32B 27/38* (2013.01); *C08G 59/4021* (2013.01); *C08L 63/00* (2013.01); *B32B 2457/00* (2013.01)

(58) Field of Classification Search
None
See application file for complete search history.

(56) References Cited

U.S. PATENT DOCUMENTS

| 4,868,230 A * | 9/1989 | Rao ...................... C08G 59/066 |
| | | 523/403 |
| 2010/0056671 A1* | 3/2010 | Dershem ............ C08G 59/3209 |
| | | 528/421 |
| 2011/0132646 A1* | 6/2011 | Levchik ............. C08G 59/4071 |
| | | 525/396 |

FOREIGN PATENT DOCUMENTS

| JP | H0853533 | 2/1996 |
| JP | 2006335796 | 12/2006 |
| JP | 2013040271 | 2/2013 |
| JP | 2014177581 | 9/2014 |
| JP | 2014185271 | 10/2014 |
| WO | 2013146478 | 10/2013 |
| WO | 2019123941 | 6/2019 |
| WO | 2019123943 | 6/2019 |

OTHER PUBLICATIONS

"International Search Report (Form PCT/ISA/210) of PCT/JP2019/029769," dated Nov. 5, 2019, with English translation thereof, pp. 1-4.

* cited by examiner

*Primary Examiner* — Michael J Feely
(74) *Attorney, Agent, or Firm* — JCIPRNET

(57) ABSTRACT

The present invention provides a resin composition containing an epoxy compound A having a specific structure having an aromatic ring, and having an epoxy equivalent in the range of from 500 to 10,000 g/eq, and an epoxy compound B having an epoxy equivalent in the range of from 100 to 300 g/eq, and a bonding agent containing the resin composition. Further, the present invention provides a cured product containing resin particles and a matrix resin, wherein the resin particles are a cured product of an epoxy compound A having a specific structure having an aromatic ring, and having an epoxy equivalent in the range of from 500 to 10,000 g/eq, and the matrix resin is a cured product of an epoxy compound B having an epoxy equivalent in the range of from 100 to 300 g/eq, and a laminate having a substrate and the cured product.

14 Claims, No Drawings

RESIN COMPOSITION, CURED PRODUCT, LAMINATE, AND ELECTRONIC MEMBER

CROSS-REFERENCE TO RELATED APPLICATION

This application is a 371 application of the International PCT application serial no. PCT/JP2019/029769, filed on Jul. 30, 2019, which claims the priority benefit of Japan Patent Application No. 2018-177360, filed on Sep. 21, 2018. The entirety of each of the above-mentioned patent applications is hereby incorporated by reference herein and made a part of this specification.

TECHNICAL FIELD

The present invention relates to a composition having two types of epoxy compounds having a specific structure, and a cured product obtained by curing the composition. In addition, the invention relates to a laminate having a layer of the cured product.

BACKGROUND ART

For reducing the $CO_2$ emissions or for improving the fuel consumption rate, and the like, automobiles and aircraft are further reduced in weight, and according to such a tendency, lightweight automobiles and aircraft are being achieved by reducing the number of spot welding or using a fiber-reinforced resin and a metal in combination, or the like. Therefore, a bonding agent for structural material used in these automobiles and others is strongly desired to have high performance. Particularly, when heat-bonding aluminum and a fiber-reinforced resin which have a large difference in thermal expansion, a problem arises in that expansion and shrinkage cause an interfacial stress, so that warpage or waviness occurs, and thus a bonding agent which can relax the stress is needed.

Further, advanced electronic materials used in a semiconductor encapsulating material and an insulating layer for multilayer printed board and the like are affected by a tendency of the marked reduction of thickness and have a serious problem of the occurrence of warpage due to a difference of thermal expansion between a silicon chip and a metal, and hence are more strongly desired to have a stress relaxation function than ever before.

Meanwhile, an epoxy resin has dimensional stability upon being cured, electrical insulation properties, and a chemical resistance, and hence has been widely used as a bonding agent. However, the epoxy resin which maintains high adhesion properties is likely to be hard and brittle, and therefore there have been disclosed flexible epoxy compounds, such as a high molecular-weight epoxy compound obtained by reacting a liquid bisphenol A epoxy resin with an aliphatic dicarboxylic acid, such as a dimer acid or sebacic acid, as a molecular chain extender (see, for example, PTL 1), and a high molecular-weight epoxy compound derived from a hydroxy compound having an aliphatic hydrocarbon group (see PTL 2). However, the deformation mode of the flexible epoxy compound is plastic deformation, and therefore the flexible epoxy compound has a problem about durability such that it cannot repeatedly follow an expansion difference with a substrate while maintaining rigidity of the whole.

Further, an epoxy compound that undergoes elastic deformation and exhibits high elongation generally has a low glass transition temperature, and has excellent flexibility and adhesion properties at around the glass transition temperature, but is markedly reduced in the adhesive force in a high temperature region of the glass transition temperature or higher. On the other hand, an epoxy resin having a high glass transition temperature has small dependency of the adhesive force on temperature, but has poor flexibility and no stress relaxation function.

Thus, there is desired an epoxy compound that produces a flexible cured product which has both high elongation such that the cured product undergoes elastic deformation, and adhesion properties at ordinary room temperature and in a high temperature region.

CITATION LIST

Patent Literature

PTL 1: JP-A-8-53533
PTL 2: JP-A-2006-335796

SUMMARY OF INVENTION

Technical Problem

A task to be achieved by the present invention is to provide a resin composition that produces a flexible cured product which has both high flexibility such that the cured product is resistant to a change of temperature and deformation, and high adhesion properties such that the cured product is resistant to a thermal expansion difference with a substrate.

Further, another task is to provide a cured product obtained by curing the resin composition, and a laminate having the cured product and a substrate.

Solution to Problem

The present inventors have conducted extensive and intensive studies. As a result, it has been found that, by providing a resin composition having incorporated two types of epoxy compounds having a specific structure, the above-mentioned problems can be solved. Specifically, the present invention provides a resin composition which contains an epoxy compound A having a structure of the general formula (1) below and having an epoxy equivalent in the range of from 500 to 10,000 g/eq, and an epoxy compound B having an epoxy equivalent in the range of from 100 to 300 g/eq:

[Chem. 1]

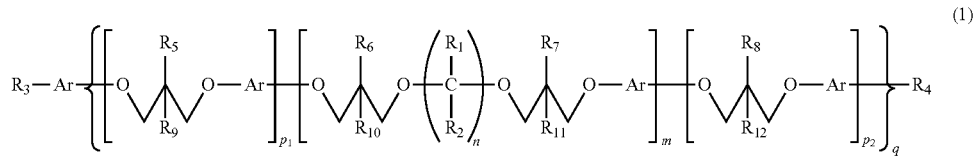

wherein, in the formula (1), each Ar independently represents a structure having an aromatic ring,
each of $R_1$ and $R_2$ independently represents a hydrogen atom or an alkyl group having 1 or 2 carbon atoms,
each of $R_3$ to $R_8$ independently represents a hydroxyl group, a glycidyl ether group and/or a 2-methylglycidyl ether group,
wherein at least one of $R_3$ to $R_8$ is a glycidyl ether group or a 2-methylglycidyl ether group,
each of $R_9$ to $R_{12}$ independently represents a hydrogen atom or a methyl group,
n is an integer of 11 to 16, and
m, $p_1$, $p_2$, and q are an average of the number of repeating units,
and m is 0.5 to 25,
each of $p_1$ and $p_2$ is independently 0 to 5, and
q represents 0.5 to 5,
wherein the individual repeating units present in the repeating units of the structure are the same or different.

Further, the above-mentioned problems are solved by providing a cured product obtained by curing the resin composition, and a laminate having a layer of the cured product and a substrate.

Advantageous Effects of Invention

The resin composition of the present invention contains an epoxy compound A having a long alkyl chain as a principal chain, and an epoxy compound B having a low epoxy equivalent. The resin composition can provide a flexible cured product which has both high elongation such that the cured product undergoes elastic deformation, and high adhesion properties such that the cured product is resistant to a thermal expansion difference with a substrate.

DESCRIPTION OF EMBODIMENTS

<Epoxy Compound A>

The epoxy compound A in the invention is a compound having an epoxy equivalent of 500 to 10,000 g/eq, and being represented by the following formula (1):

[Chem. 2]

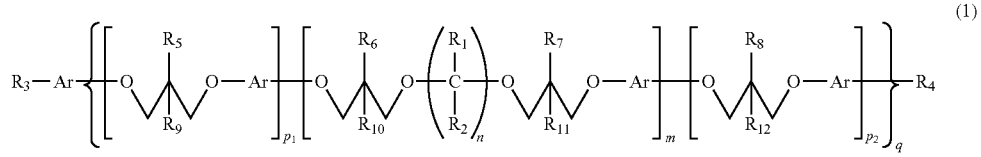

wherein, in the formula (1), each Ar independently represents a structure having an aromatic ring,
each of $R_1$ and $R_2$ independently represents a hydrogen atom or an alkyl group having 1 or 2 carbon atoms,
each of $R_3$ to $R_8$ independently represents a hydroxyl group, a glycidyl ether group and/or a 2-methylglycidyl ether group,
wherein at least one of $R_3$ to $R_8$ is a glycidyl ether group or a 2-methylglycidyl ether group,
each of $R_9$ to $R_{12}$ independently represents a hydrogen atom or a methyl group,
n is an integer of 11 to 16, and
m, $p_1$, $p_2$, and q are an average of the number of repeating units,
and m is 0.5 to 25,
each of $p_1$ and $p_2$ is independently 0 to 5, and
q represents 0.5 to 5,
wherein the individual repeating units present in the repeating units of the structure are the same or different.

The epoxy compound A in the invention has an epoxy equivalent of 500 to 10,000 g/eq, and especially, the epoxy compound A having an epoxy equivalent of 600 to 8,000 g/eq is preferred from the viewpoint of the obtained cured product which has an appropriate crosslinking density, and which can achieve flexibility and toughness as well as heat resistance.

In the general formula (1) above, each Ar independently represents a structure having an aromatic ring being unsubstituted or having a substituent. With respect to the aromatic ring in the formula, for example, there can be mentioned a benzene ring, a naphthalene ring, an anthracene ring, a phenanthrene ring, and a fluorene ring. Ar which is the structure having such an aromatic ring preferably indicates a structure represented by the following formula (2):

[Chem. 3]
(2)
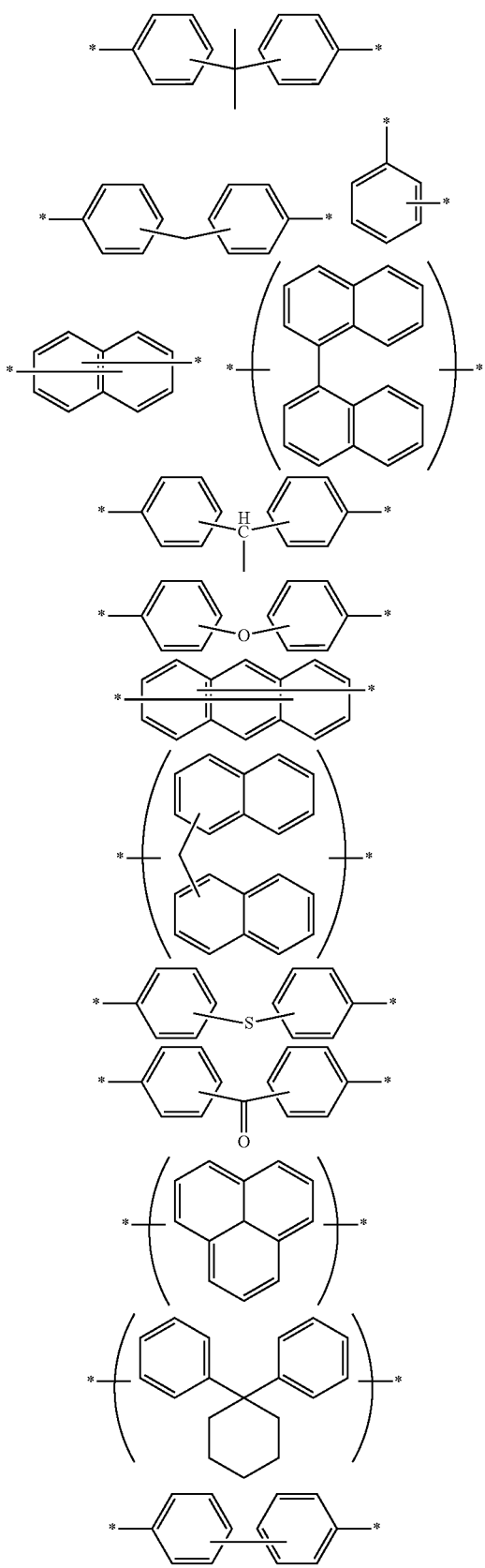
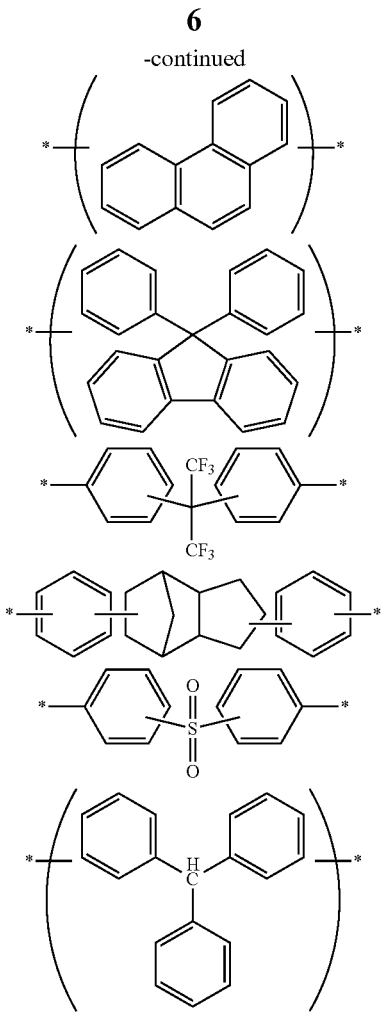
wherein, in the formula (2), the aromatic ring is substituted or unsubstituted, and * represents a bonding site.
In the formula (2) above, from the viewpoint of obtaining a cured product having excellent balance between the flexibility, modulus, and adhesion properties, with respect to the structure of Ar, the following structures are especially preferred.
[Chem. 4]
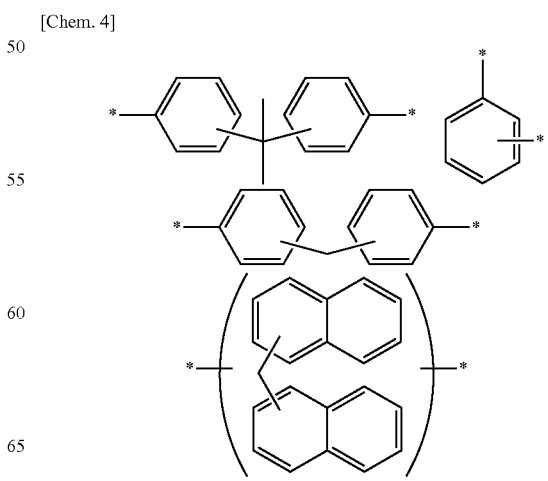

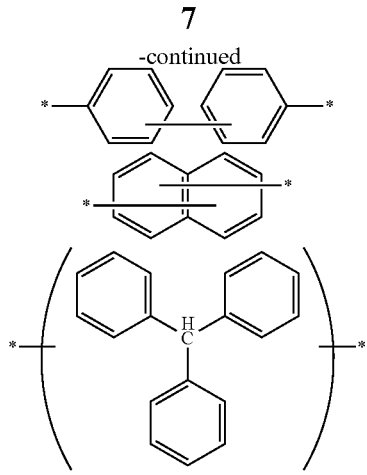

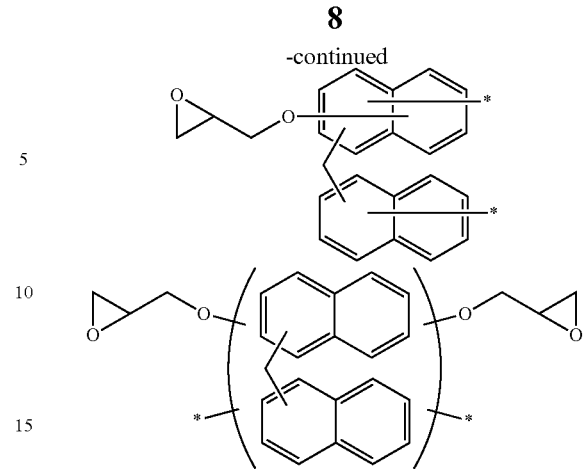

When Ar has a substituent, preferred examples of substituents include an alkyl group, a halogen atom, a glycidyl ether group, and a 2-methylglycidyl ether group. Preferred are an alkyl group, a glycidyl ether group, and a 2-methylglycidyl ether group, and a glycidyl ether group and/or a 2-methylglycidyl ether group is especially preferred because the obtained cured product has excellent dimensional stability.

As examples of especially preferred structures of Ar having a substituent, there can be mentioned the following structures.

[Chem. 5]

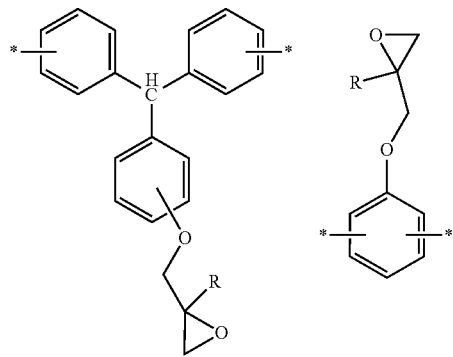

In the epoxy compound A represented by the formula 1 above, the number of repeating units n is an integer of 11 to 16, preferably 12 to 15. When n is 11 or more, the adhesive force is improved, and further the cured product has a deformation mode which is elastic deformation. Further, when n is 16 or less, lowering of the crosslinking density can be suppressed.

In the epoxy compound A represented by the formula 1 above, m, p1, p2, and q are an average of the number of repeating units, and m is 0.5 to 25, each of $p_1$ and $p_2$ is independently 0 to 5, and q represents 0.5 to 5.

The average of the number of repeating units can be obtained by measurement by GPC. With respect to m, $p_1$, $p_2$, and q, from the viewpoint of achieving flexibility and toughness as well as durability, it is preferred that m is 1.0 to 10, $p_1$ and $p_2$ are 0.5 to 3.0, and q is 0.6 to 3.0.

In the epoxy compound A represented by the formula (1) above, each of $R_1$ and $R_2$ independently represents a hydrogen atom or an alkyl group having 1 or 2 carbon atoms, each of $R_3$ to $R_8$ independently represents a hydroxyl group or a glycidyl ether group or a 2-methylglycidyl ether group, wherein at least one of $R_3$ to $R_8$ is a glycidyl ether group or a 2-methylglycidyl ether group, and each of $R_9$ to $R_{12}$ independently represents a hydrogen atom or a methyl group.

As examples of preferred structures of the epoxy compound A represented by the formula (1) above, there can be mentioned the following structures.

[Chem. 6]

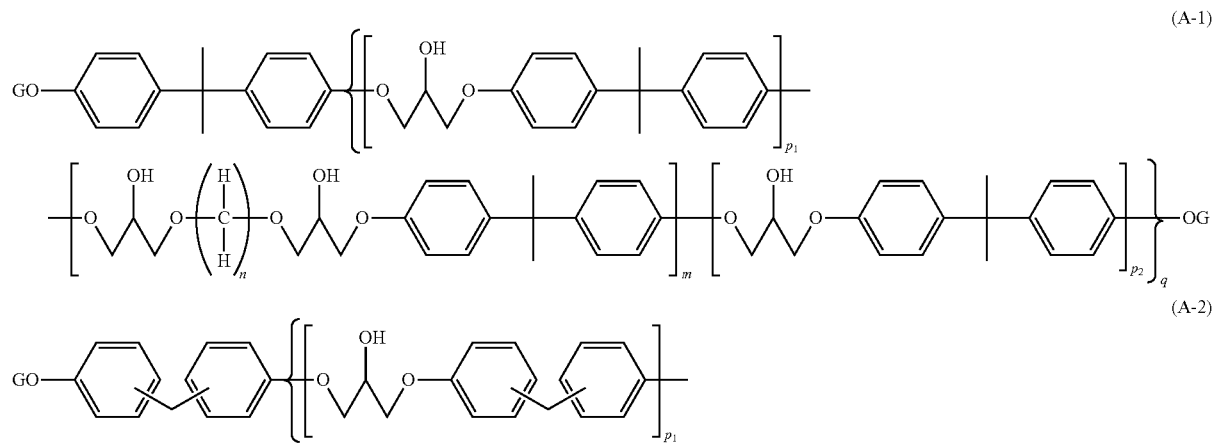

-continued
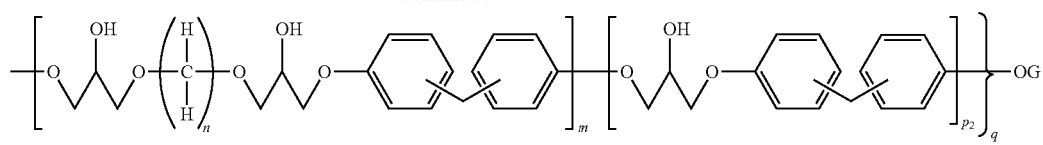
(A-3)
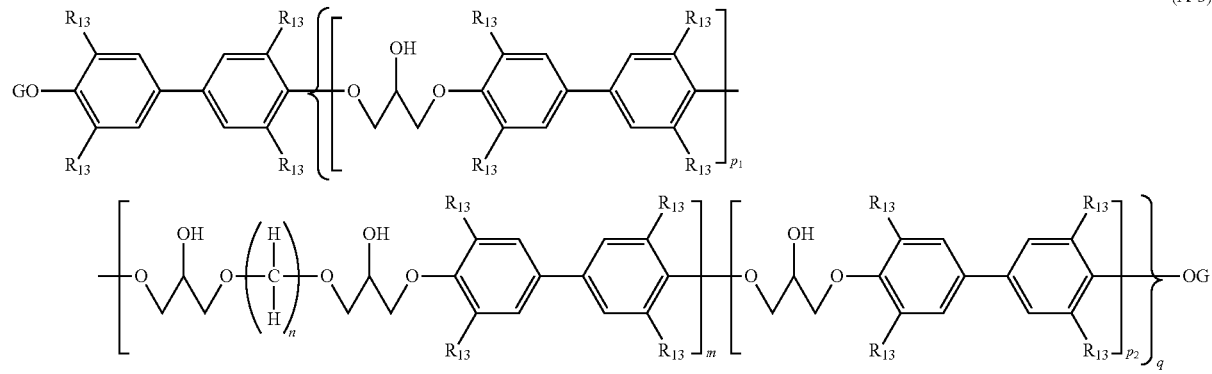
(A-4)
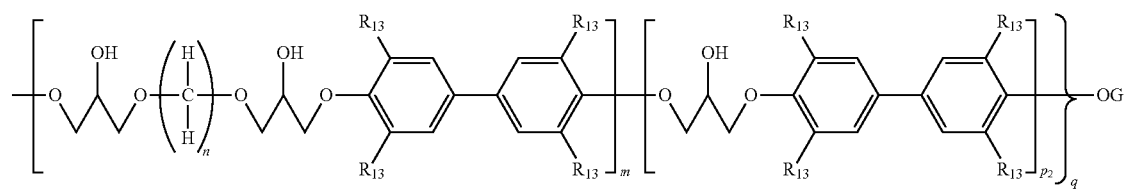
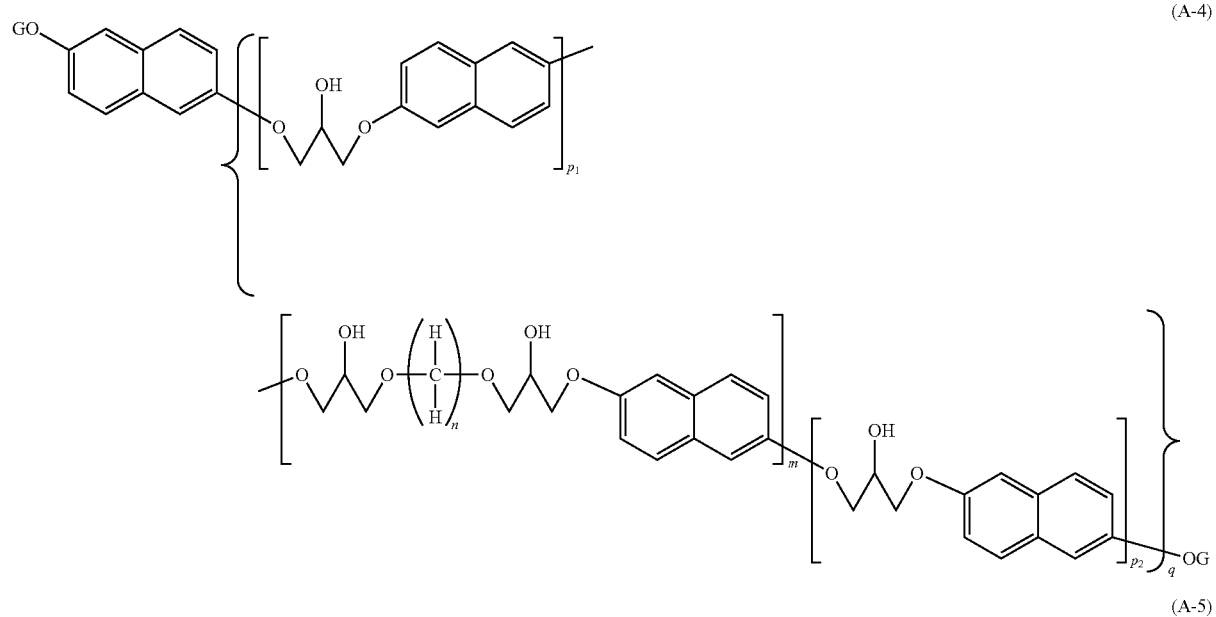
(A-5)
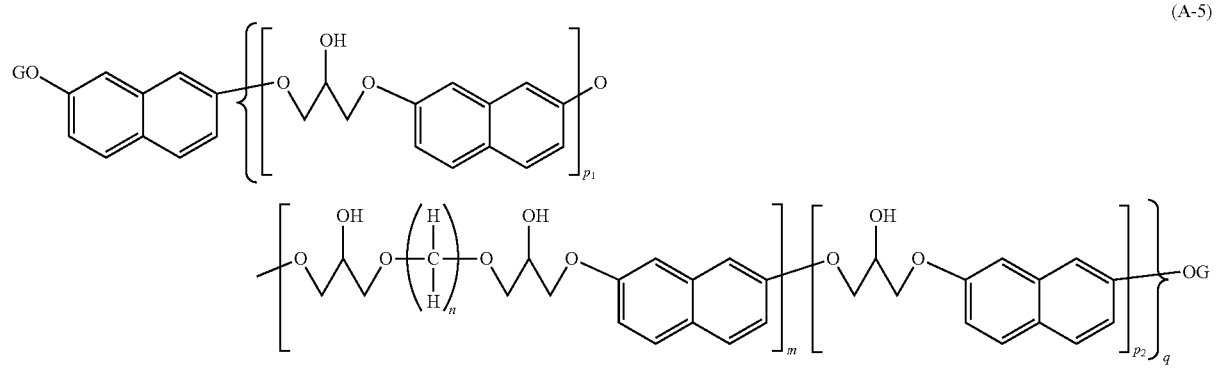
[Chem. 7]
(A-6)
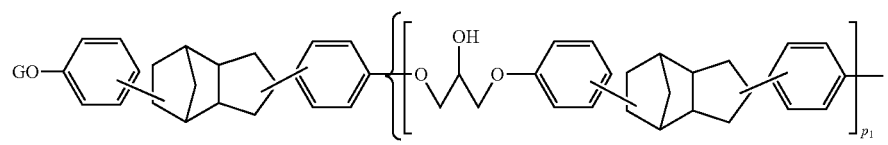

-continued
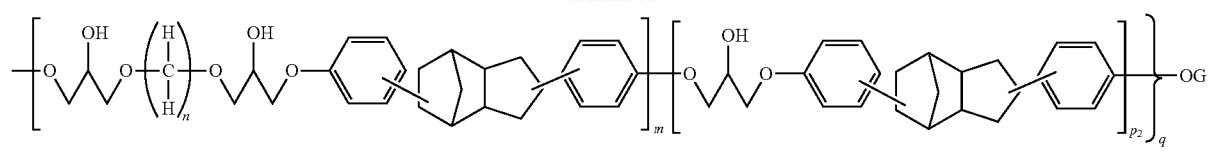
(A-7)
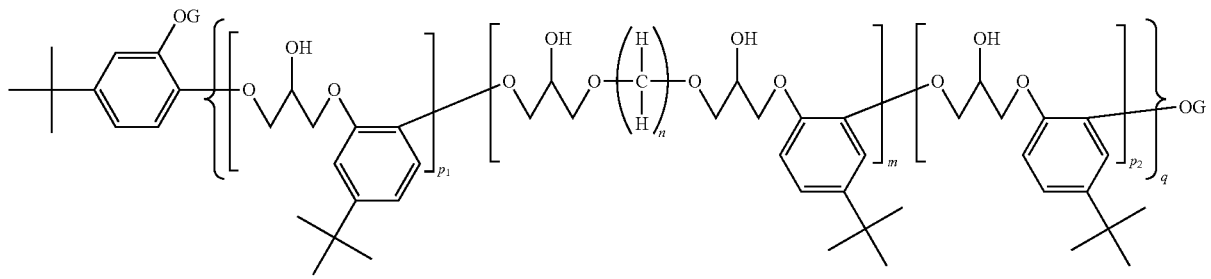
(A-8)
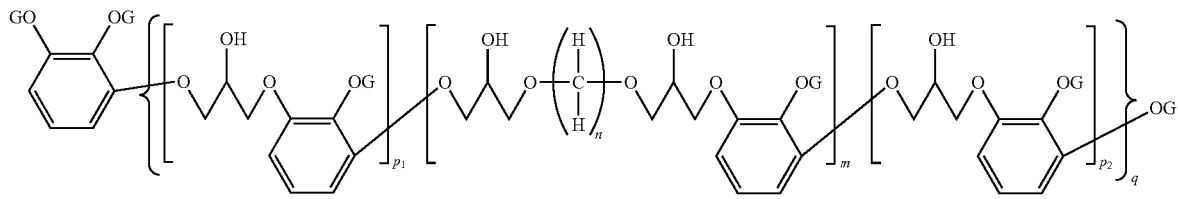
(A-9)
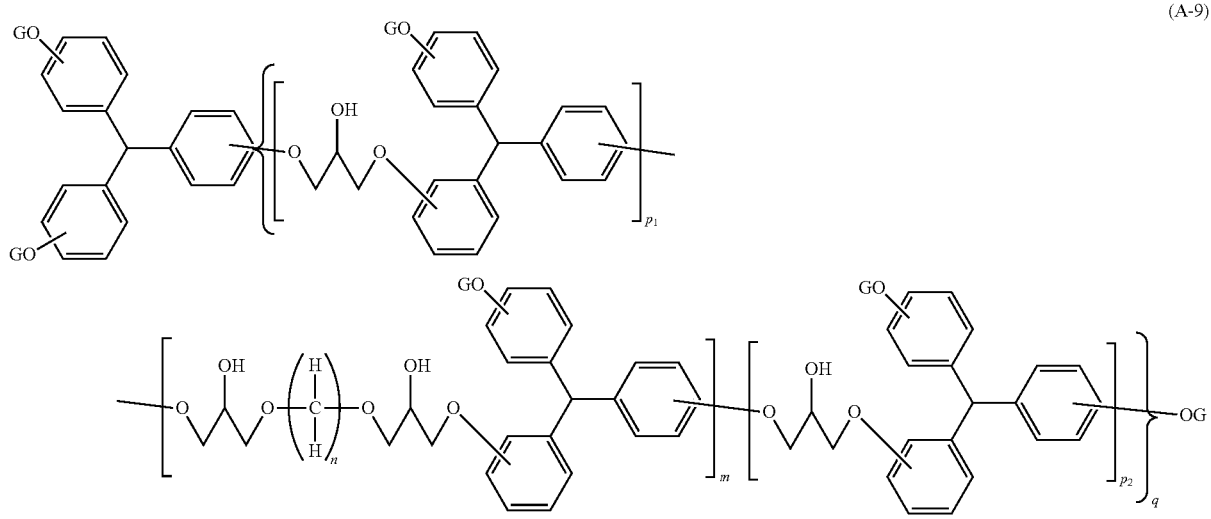
(A-10)
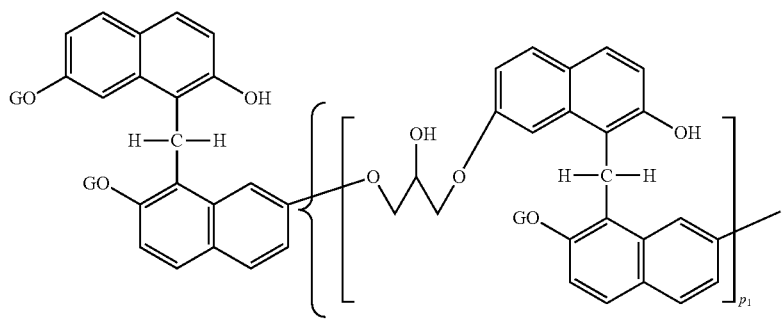

-continued

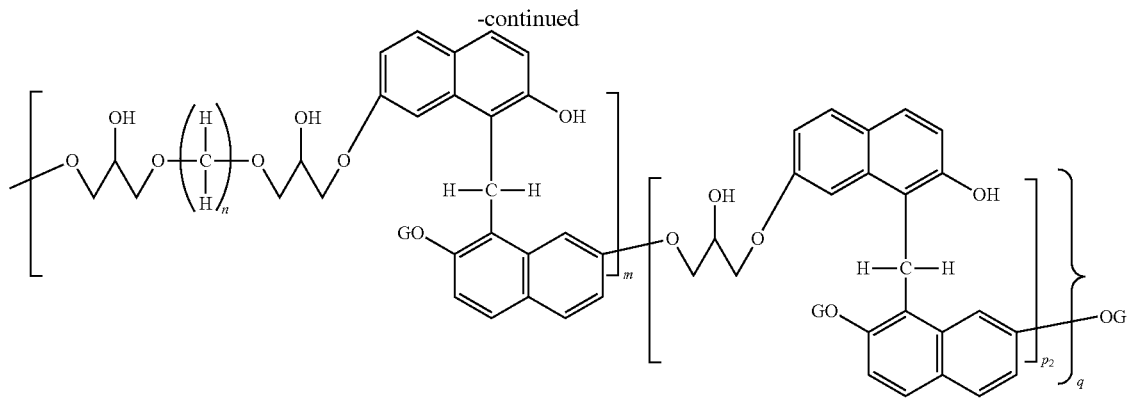

[Chem. 8]

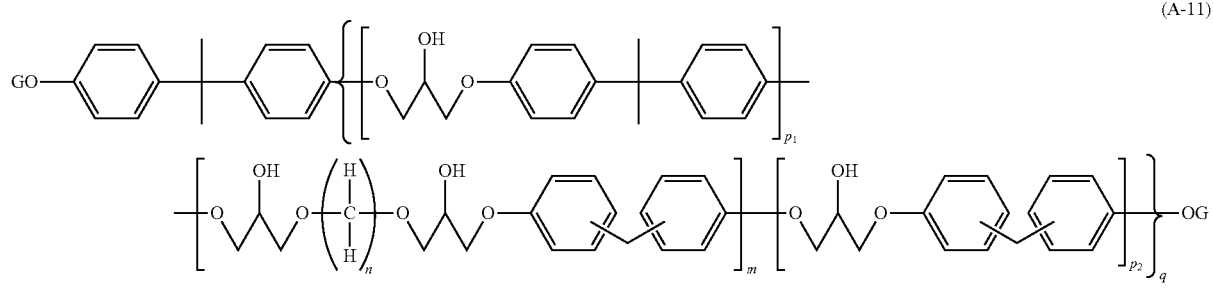

(A-11)

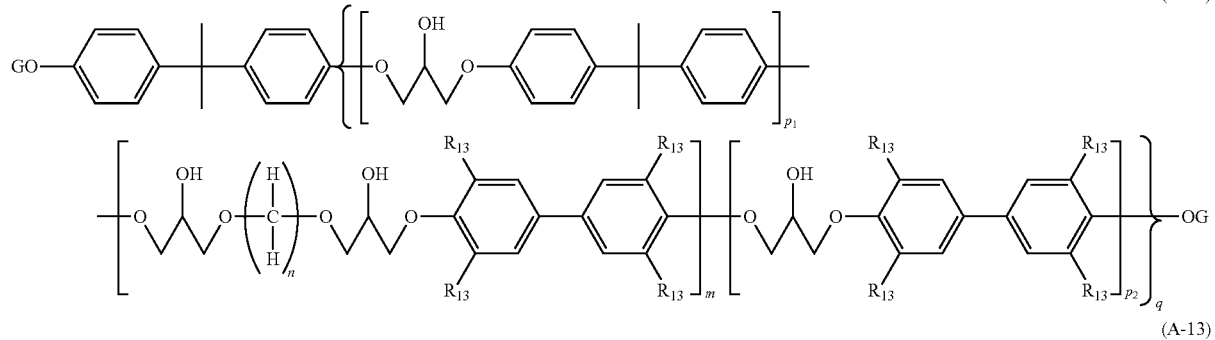

(A-12)

(A-13)

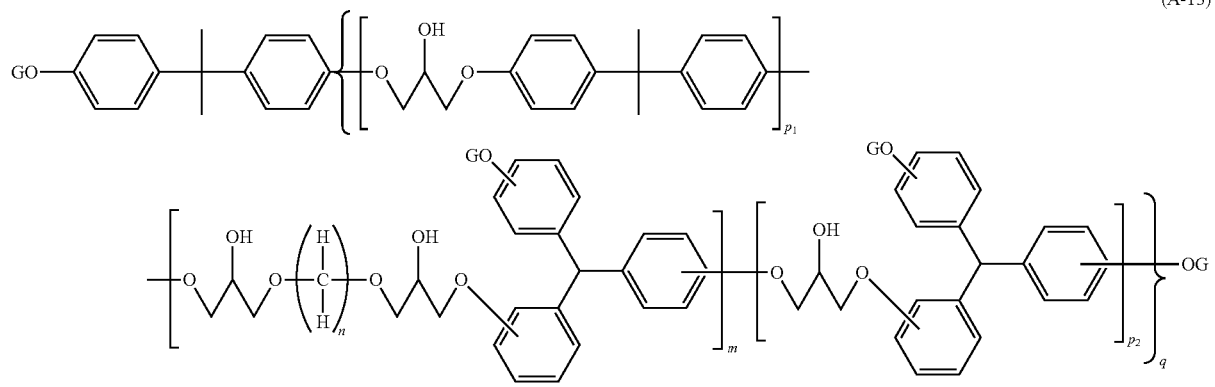

In each of the above structural formulae, G is a glycidyl group, $R_{13}$ is a hydrogen atom and/or a methyl group, n is an integer of 11 to 16, and m, p1, p2, and q are an average of the number of repeating units, and m is 0.5 to 25, each of p1 and p2 is independently 0 to 5, and q represents 0.5 to 5.

Of the above structural formulae, from the viewpoint of the obtained cured product which has excellent balance of physical properties, the epoxy compound A represented by the structural formula (A-1), (A-2), (A-3), (A-5), (A-8), (A-9), or (A-10) above is most preferably used.

<Method for Producing the Epoxy Compound A>

With respect to the method for producing the epoxy compound A in the invention, there is no particular limitation, but, from the viewpoint of easy availability of the raw materials and easy reaction, for example, preferred is a method in which a diglycidyl ether (a1) of an aliphatic dihydroxy compound and an aromatic hydroxy compound (a2) are reacted with each other in such amounts that the molar ratio (a1)/(a2) is in the range of from 1/1.01 to 1/5.0 to obtain a hydroxy compound B, and further the obtained hydroxy compound B is reacted with an epihalohydrin (a3).

<Hydroxy Compound B>

When the epoxy compound A is obtained by reacting the diglycidyl ether (a1) of the aliphatic dihydroxy compound and the aromatic hydroxy compound (a2) to obtain the hydroxy compound B, and further reacting the obtained hydroxy compound B with the epihalohydrin (a3), the hydroxy compound B can be obtained by reacting the diglycidyl ether (a1) of the aliphatic dihydroxy compound and the aromatic hydroxy compound (a2) in such amounts that the molar ratio (a1)/(a2) is in the range of from 1/1.01 to 1/5.0.

The hydroxy compound B contains the unreacted aromatic hydroxy compound (a2), but may be used as such in the invention, or the hydroxy compound B which has the aromatic hydroxy compound (a2) removed therefrom may be used.

A method for removing the unreacted aromatic hydroxy compound (a2) can be conducted in accordance with various types of methods. For example, there can be mentioned a column chromatography separation method utilizing a difference of the polarity, a fractional distillation method utilizing a difference of the boiling point, and an alkaline aqueous solution extraction method utilizing a difference of the solubility in an alkaline aqueous solution. Of these, in view of the efficiency and the like, preferred is the alkaline aqueous solution extraction method which causes no thermal change of properties, and, in this method, as an organic solvent used for dissolving an intended material, one which is immiscible with water, such as toluene or methyl isobutyl ketone, can be used, but, from the viewpoint of the dissolving properties for an intended material, the methyl isobutyl ketone is preferred. The content of the unreacted aromatic hydroxy compound (a2) present in the obtained hydroxy compound B is preferably 0.1 to 30% by mass from the viewpoint of obtaining a cured product having excellent balance between the toughness and flexibility.

With respect to the diglycidyl ether (a1) of the aliphatic dihydroxy compound, there is no particular limitation, and examples of such diglycidyl ethers include 1,11-undecanediol diglycidyl ether, 1,12-dodecanediol diglycidyl ether, 1,13-tridecanediol diglycidyl ether, 1,14-tetradecanediol diglycidyl ether, 1,15-pentadecanediol diglycidyl ether, 1,16-hexadecanediol diglycidyl ether, 2-methyl-1,11-undecanediol diglycidyl ether, 3-methyl-1,11-undecanediol diglycidyl ether, and 2,6,10-trimethyl-1,11-undecanediol diglycidyl ether. These diglycidyl ethers may contain an organic chlorine impurity formed during the glycidyl etherification reaction of the hydroxy compound, and may contain an organic chlorine, such as 1-chloromethyl-2-glycidyl ether (chloromethyl compound) represented by the structure below. These diglycidyl ethers may be used individually or in combination.

[Chem. 9]

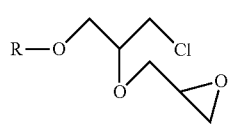

Chloromethyl compound

Of these, from the viewpoint of the obtained cured product which has excellent balance between the flexibility and heat resistance, preferred is a compound having a structure in which a glycidyl group is linked to both ends of an alkylene chain having 12 to 14 carbon atoms through an ether group, and 1,12-dodecanediol diglycidyl ether, 1,13-tridecanediol diglycidyl ether, or 1,14-tetradecanediol diglycidyl ether is most preferably used.

With respect to the aromatic hydroxy compound (a2), there is no particular limitation, and examples of the aromatic hydroxy compounds include dihydroxybenzenes, such as hydroquinone, resorcin, and catechol; trihydroxybenzenes, such as pyrogallol, 1,2,4-trihydroxybenzene, and 1,3,5-trihydroxybenzene; triphenylmethane phenols, such as 4,4',4"-trihydroxytriphenylmethane; dihydroxynaphthalenes, such as 1,6-dihydroxynaphthalene, 2,7-dihydroxynaphthalene, 1,4-dihydroxynaphthalene, 1,5-dihydroxynaphthalene, 2,3-dihydroxynaphthalene, and 2,6-dihydroxynaphthalene; tetra-functional phenols obtained by subjecting a dihydroxynaphthalene to coupling reaction, such as 1,1'-methylenebis-(2,7-naphthalenediol), 1,1'-binaphthalene-2,2',7,7'-tetraol, and 1,1'-oxybis-(2,7-naphthalenediol); bisphenols, such as bis(4-hydroxyphenyl)methane, 2,2-bis(4-hydroxyphenyl)propane, 2,2-bis(3-methyl-4-hydroxyphenyl)propane, 1,1-bis(4-hydroxyphenyl) cyclohexane, 1,1-bis(4-hydroxyphenyl)-1-phenylethane, and bis(4-hydroxyphenyl) sulfone; biphenols, such as 2,2'-biphenol, 4,4'-biphenol, (1,1'-biphenyl)-3,4-diol, 3,3'-dimethyl-(1,1'-biphenyl)-4,4'-diol, 3-methyl-(1,1'-biphenyl)-4,4'-diol, 3,3',5,5'-tetramethylbiphenyl-2,2'-diol, 3,3',5,5'-tetramethylbiphenyl-4,4'-diol, 5-methyl-(1,1'-biphenyl)-3,4'-diol, 3'-methyl-(1,1'-biphenyl)-3,4'-diol, and 4'-methyl-(1,1'-biphenyl)-3,4'-diol; alicyclic structure-containing phenols, such as a polyaddition product of phenol and dicyclopentadiene, and a polyaddition product of phenol and a terpene compound; naphthols, such as bis(2-hydroxy-1-naphthyl)methane and bis(2-hydroxy-1-naphthyl)propane; and so-called zylock phenolic resins which are a condensation reaction product of phenol and phenylenedimethyl chloride or biphenylenedimethyl chloride, and these compounds may be used individually or in combination. Further examples include difunctional phenol compounds having a structure of the above-mentioned compound having the aromatic nucleus thereof substituted with a methyl group, a t-butyl group, or a halogen atom as a substituent. In the above-mentioned alicyclic structure-containing phenols and zylock phenolic resins, not only a difunctional component but also a tri- or more functional component can be simultaneously present, but, in the invention, the phenols and phenolic resins can be used as such, or only the difunctional component may be used by being extracted through the purification step using a column or the like.

Of these, from the viewpoint of obtaining a cured product having excellent balance between the flexibility and toughness, bisphenols are preferred, and particularly, in view of having remarkable performance of imparting toughness, bis(4-hydroxyphenyl)methane and 2,2-bis(4-hydroxyphenyl)propane are preferred. Further, when a cured product having excellent curing properties or heat resistance is particularly obtained, dihydroxynaphthalenes are preferred, and particularly, in view of having remarkable performance of imparting fast-curing properties, 2,7-dihydroxynaphthalene is preferred. Further, when a cured product having excellent moisture resistance is particularly obtained, a phenol having an alicyclic structure is preferably used.

With respect to the reaction ratio of the diglycidyl ether (a1) of the aliphatic dihydroxy compound and the aromatic hydroxy compound (a2), for using the obtained compound as a curing agent for the epoxy resin, it is necessary that the reaction be conducted so that the (a1)/(a2) ratio is in the range of from 1/1.01 to 1/5.0 (molar ratio), and, from the viewpoint of the obtained cured product which has excellent balance between the flexibility and heat resistance, it is preferred that the (a1)/(a2) ratio is 1/1.02 to 1/3.0 (molar ratio).

It is preferred that the reaction of the diglycidyl ether (a1) of the aliphatic dihydroxy compound and the aromatic hydroxy compound (a2) is conducted in the presence of a catalyst. With respect to the catalyst, various types of catalysts can be used, and examples of catalysts include alkaline (earth) metal hydroxides, such as sodium hydroxide, potassium hydroxide, lithium hydroxide, and calcium hydroxide; alkali metal carbonates, such as sodium carbonate and potassium carbonate; phosphorus compounds, such as triphenylphosphine; DMP-30; DMAP; quaternary ammonium salts, such as chloride, bromide, or iodide of tetramethylammonium, tetraethylammonium, tetrabutylammonium, benzyltributylammonium or the like, and chloride, bromide, or iodide of tetramethylphosphonium, tetraethylphosphonium, tetrabutylphosphonium, benzyltributylphosphonium or the like; tertiary amines, such as triethylamine, N,N-dimethylbenzylamine, 1,8-diazabicyclo[5.4.0]undecene, and 1,4-diazabicyclo[2.2.2]octane; and imidazoles, such as 2-ethyl-4-methylimidazole and 2-phenylimidazole. Two or more of these catalysts may be used in combination. Of these, from the viewpoint of causing the reaction to quickly proceed and achieving high effect of reducing the impurity amount, sodium hydroxide, potassium hydroxide, triphenylphosphine, and DMP-30 are preferred. With respect to the amount of the catalyst used, there is no particular limitation, but the catalyst is preferably used in an amount of 0.0001 to 0.1 mol, relative to 1 mol of the phenolic hydroxyl group of the aromatic hydroxy compound (a2). With respect to the form of the catalyst, there is no particular limitation, and the catalyst may be used in the form of an aqueous solution, or may be used in the form of a solid.

Further, the reaction of the diglycidyl ether (a1) of the aliphatic dihydroxy compound and the aromatic hydroxy compound (a2) can be conducted without a solvent or in the presence of an organic solvent. Examples of usable organic solvents include methyl cellosolve, ethyl cellosolve, toluene, xylene, methyl isobutyl ketone, dimethyl sulfoxide, propyl alcohol, and butyl alcohol. The amount of the organic solvent used is generally 50 to 300% by mass, preferably 100 to 250% by mass, based on the total mass of the raw materials charged. These organic solvents can be used individually or in combination. For conducting the reaction at high rate, it is preferred that the reaction is conducted without a solvent. On the other hand, from the viewpoint of reducing impurities in the final product, dimethyl sulfoxide is preferably used.

In the above-mentioned reaction, the reaction temperature is generally 50 to 180° C., and the reaction time is generally 1 to 30 hours. From the viewpoint of reducing impurities in the final product, the reaction temperature is preferably 100 to 160° C. Further, when the obtained compound suffers marked coloration, an antioxidant or a reducing agent may be added for suppressing the coloration. With respect to the antioxidant, there is no particular limitation, but examples of antioxidants include hindered phenol compounds, such as a 2,6-dialkylphenol derivative, divalent sulfur compounds, and phosphite compounds containing a trivalent phosphorus atom. With respect to the reducing agent, there is no particular limitation, but examples of reducing agents include hypophosphorous acid, phosphorous acid, thiosulfuric acid, sulfurous acid, a hydrosulfite, and salts thereof.

After completion of the reaction, a neutralization or water washing treatment can be conducted until the pH of the reaction mixture becomes 3 to 7, preferably 5 to 7. The neutralization treatment and water washing treatment may be conducted in accordance with a general method. For example, when a basic catalyst is used, an acid material, such as hydrochloric acid, sodium primary hydrogenphosphate, p-toluenesulfonic acid, or oxalic acid, can be used as a neutralizing agent. After the neutralization or water washing treatment is conducted, if necessary, the solvent is distilled off by heating under a reduced pressure to concentrate the product, obtaining a compound.

As examples of preferred structures of the hydroxy compound B, there can be mentioned the following structures.

[Chem. 10]

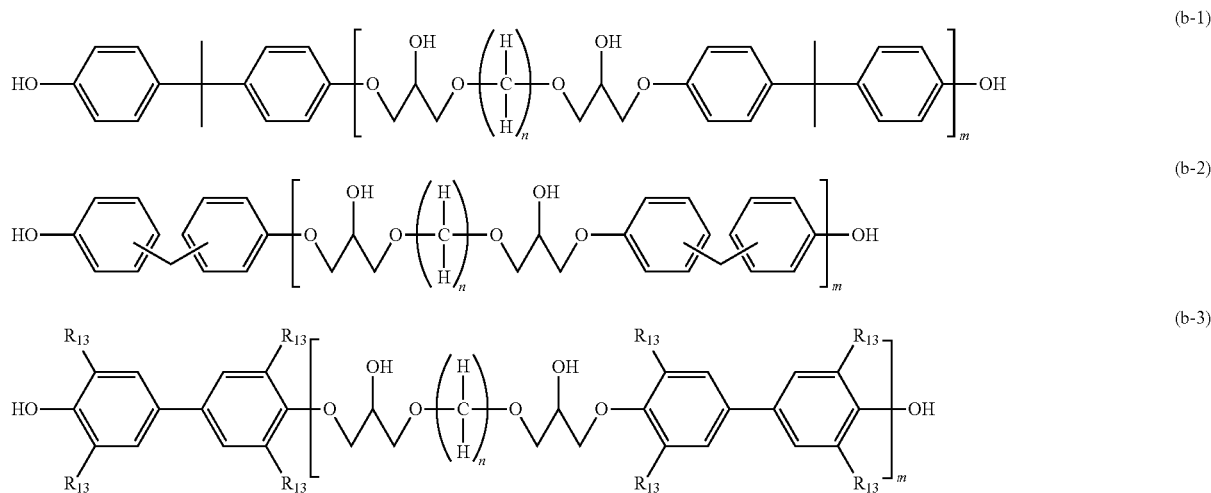

-continued
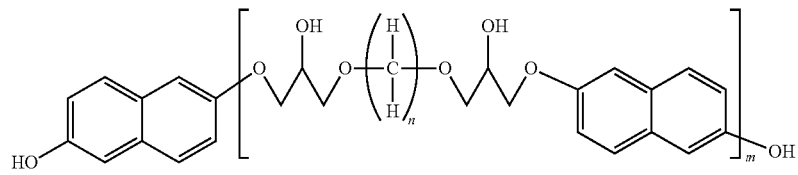
(b-4)
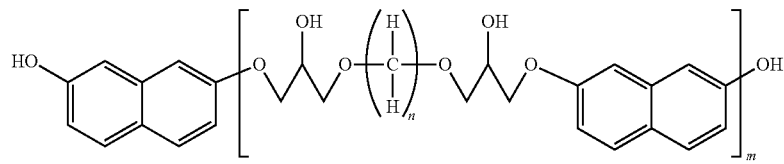
(b-5)
[Chem. 11]
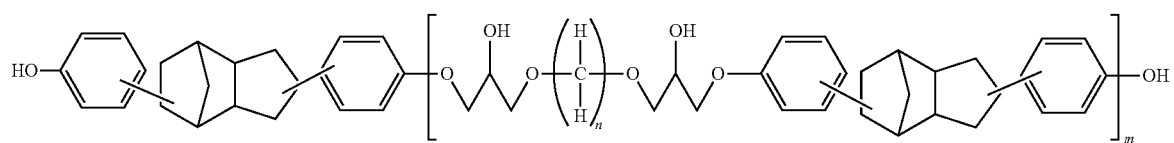
(b-6)
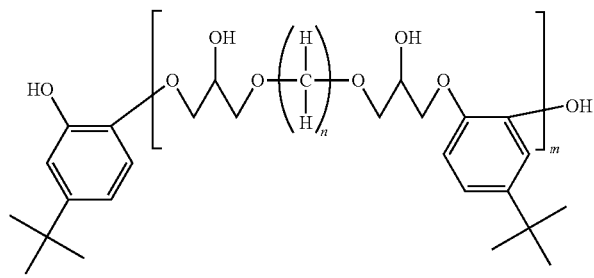
(b-7)
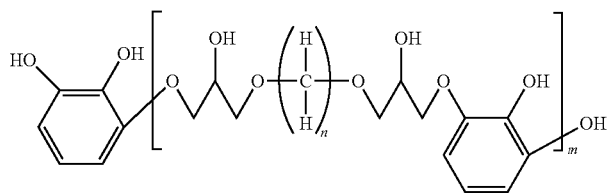
(b-8)
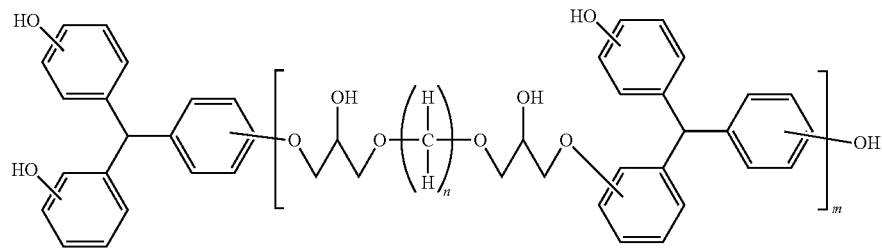
(b-9)

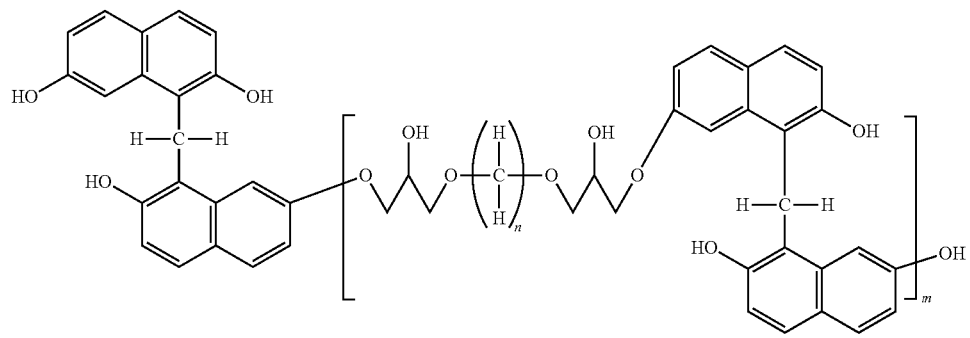
(b-10)

[Chem. 12]

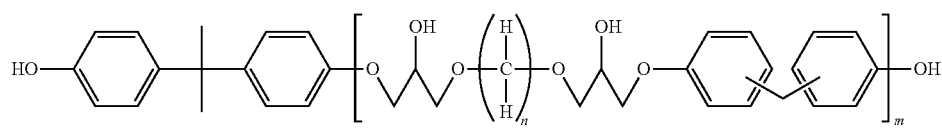
(b-11)

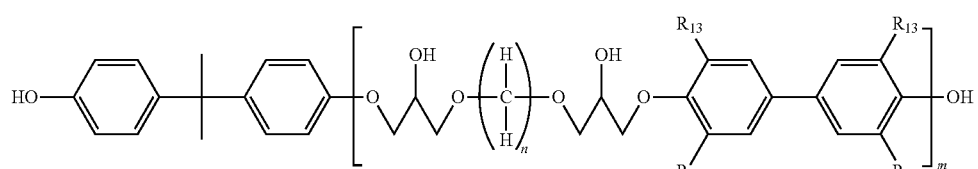
(b-12)

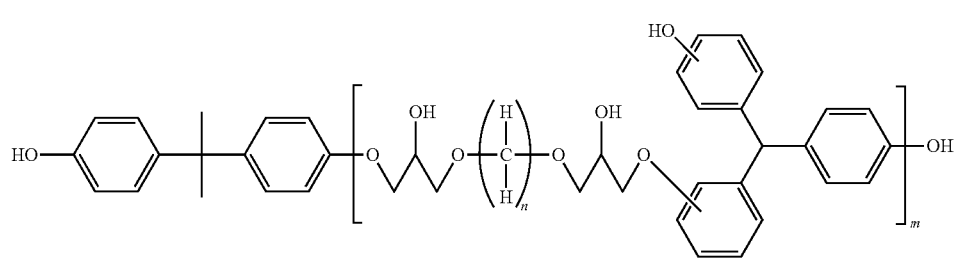
(b-13)

In each of the above structural formulae, $R_{13}$ is a hydrogen atom and/or a methyl group, n is an integer of 11 to 16, and m is an average of the number of repeating units, and 0.5 to 25.

<Glycidyl Etherification Reaction>

In the method for producing the epoxy compound A in the invention, with respect to the method for a glycidyl etherification reaction of the hydroxy compound B, there is no particular limitation, and examples include a method in which a phenolic hydroxyl group and the epihalohydrin are reacted with each other, and a method in which a phenolic hydroxyl group is changed to an olefin, and a carbon-carbon double bond of the olefin is oxidized using an oxidizing agent. Of these, a method using the epihalohydrin is preferably used from the viewpoint of easy availability of the raw materials and easy reaction.

As the method using the epihalohydrin (a3), for example, there can be mentioned a method in which the epihalohydrin (a3) is added in an amount of 0.3 to 100 mol, relative to 1 mol of the phenolic hydroxyl group of the hydroxy compound B obtained as mentioned above, and, while batchwise or dropwise adding to the resultant mixture a basic catalyst in an amount of 0.9 to 2.0 mol, relative to 1 mol of the phenolic hydroxyl group of the hydroxy compound B, a reaction is conducted at a temperature of 20 to 120° C. for 0.5 to 10 hours. With respect to the amount of the epihalohydrin (a3) added, as the excess amount of the epihalohydrin (a3) increases, the obtained epoxy compound has a structure that is closer to the theoretical structure, making it possible to suppress the formation of a secondary hydroxyl group caused due to a reaction of the unreacted phenolic hydroxyl group and an epoxy group. From such a point of view, especially, the amount of the epihalohydrin (a3) is preferably in the range of from 2.5 to 100 equivalent. The basic catalyst may be used in the form of a solid or an aqueous solution thereof, and, when used in the form of an aqueous solution, a method may be employed in which, while continuously adding an aqueous solution of the basic catalyst, water and the epihalohydrin (a3) are continuously distilled off from the reaction mixture under a reduced pressure or under atmospheric pressure, and further the resultant distillate is subjected to separation to remove water, and to cause the epihalohydrin (a3) to continuously go back to the reaction mixture.

In the case of performing industrial production, in the production of the epoxy compound, only a virgin epihalohydrin (a3) is used as the epihalohydrin (a3) to be charged in the first batch, but, in the subsequent batches, it is preferred that the epihalohydrin (a3) recovered from the crude reaction product and a virgin epihalohydrin (a3) in an amount corresponding to the amount of the epihalohydrin (a3) consumed by the reaction are used in combination. With respect to the epihalohydrin (a3) used in this instance, there is no particular limitation, but examples include epichlorohydrin and epibromohydrin. Of these, in view of easy availability, epichlorohydrin is preferred.

Further, with respect to the basic catalyst, there is no particular limitation, but examples of basic catalysts include alkaline earth metal hydroxides, alkali metal carbonates, and alkali metal hydroxides. Particularly, from the viewpoint of excellent catalytic activity for the epoxy resin synthesis reaction, alkali metal hydroxides are preferred, and examples include sodium hydroxide and potassium hydroxide. With respect to the use of the above alkali metal hydroxide, the alkali metal hydroxide may be used in the form of an aqueous solution at about 10 to 55% by mass, or may be used in the form of a solid.

Further, by using an organic solvent in the epoxy compound production, it is possible to improve the reaction rate in synthesis of the epoxy compound. With respect to the organic solvent, there is no particular limitation, but examples of such organic solvents include ketones, such as acetone and methyl ethyl ketone; alcohols, such as methanol, ethanol, 1-propyl alcohol, isopropyl alcohol, 1-butanol, secondary-butanol, and tertiary-butanol; cellosolves, such as methyl cellosolve and ethyl cellosolve; ethers, such as tetrahydrofuran, 1,4-dioxane, 1,3-dioxane, and diethoxyethane; and aprotic polar solvents, such as acetonitrile, dimethyl sulfoxide, and dimethylformamide. These organic solvents may be used individually, or in combination for controlling the polarity.

The product of the glycidyl forming reaction is washed with water, and then subjected to distillation while heating under a reduced pressure to distill off the unreacted epihalohydrin (a3) and the organic solvent used. Further, for obtaining an epoxy compound having further reduced a hydrolytic halogen, the obtained epoxy compound can be further subjected to reaction in such a way that the epoxy compound is further dissolved in an organic solvent, such as toluene, methyl isobutyl ketone, or methyl ethyl ketone, and an aqueous solution of an alkali metal hydroxide, such as sodium hydroxide or potassium hydroxide, is added to the resultant solution. In this instance, for the purpose of improving the reaction rate, the reaction may be conducted in the presence of a phase transfer catalyst, such as a quaternary ammonium salt or a crown ether.

When a phase transfer catalyst is used, the amount of the catalyst used is preferably in the range of from 0.1 to 3.0% by mass, based on the mass of the epoxy resin used. After completion of the reaction, the formed salt is removed by filtration, washing with water, and the like, and further a solvent, such as toluene or methyl isobutyl ketone, is distilled off by heating under a reduced pressure, so that a high-purity epoxy compound A can be obtained.

<Epoxy Compound B>

The resin epoxy compound B of the invention is an epoxy compound having an epoxy equivalent in the range of from 100 to 300 g/eq. Specifically, examples of such epoxy compounds include liquid epoxy resins, such as a bisphenol A epoxy resin, a bisphenol F epoxy resin, a bisphenol S epoxy resin, a bisphenol AD epoxy resin, a polyhydroxybenzene epoxy resin, a polyhydroxynaphthalene epoxy resin, a biphenyl epoxy resin, and a tetramethylbiphenyl epoxy resin, brominated epoxy resins, such as a brominated phenolic novolak epoxy resin, a solid bisphenol A epoxy resin, a phenolic novolak epoxy resin, a cresol novolak epoxy resin, a triphenylmethane epoxy resin, a tetraphenylethane epoxy resin, a dicyclopentadiene-phenol addition reaction epoxy resin, a phenolic aralkyl epoxy resin, a phenylene ether epoxy resin, a naphthylene ether epoxy resin, a naphthol novolak epoxy resin, a naphthol aralkyl epoxy resin, a naphthol-phenol copolycondensed novolak epoxy resin, a naphthol-cresol copolycondensed novolak epoxy resin, an aromatic hydrocarbon formaldehyde resin-modified phenolic resin-type epoxy resin, and a biphenyl-modified novolak epoxy resin, wherein each of these epoxy resins has an epoxy equivalent of 100 to 300 g/eq, and these epoxy compounds may be used individually or in combination, and the epoxy compound is preferably appropriately selected according to the intended use and the physical properties of the cured product and the like.

As a preferred epoxy compound B, among liquid epoxy resins, such as a bisphenol A epoxy resin, a bisphenol F epoxy resin, a bisphenol S epoxy resin, a bisphenol AD epoxy resin, a polyhydroxybenzene epoxy resin, a polyhydroxynaphthalene epoxy resin, a biphenyl epoxy resin, and a tetramethylbiphenyl epoxy resin, there can be mentioned epoxy compounds having an epoxy equivalent of 100 to 300 g/eq, and, among a bisphenol A epoxy resin, a bisphenol F epoxy resin, a bisphenol S epoxy resin, and a bisphenol AD epoxy resin, especially preferred are epoxy compounds having an epoxy equivalent of 100 to 300 g/eq.

<Composition>

The composition of the invention contains the epoxy compound A and the epoxy compound B in the invention.

With respect to the amount of the epoxy compound A and the epoxy compound B incorporated, there is no particular limitation, but the ratio of the epoxy compound A and the epoxy compound B is preferably 97:3 to 3:97, preferably 5:95 to 95:5, especially preferably 10:90 to 90:10. When the epoxy compound A and the epoxy compound B are incorporated in the above ratio, a cured product of the epoxy compound A and the epoxy compound B undergoes phase separation, and partially separates to form an "island-in-sea" configuration. By virtue of having the "island-in-sea" configuration, the resultant cured product advantageously has both adhesion properties and stress relaxation ability and can exhibit high adhesion in an especially wide region of temperatures. Further, the "island-in-sea" configuration advantageously has an effect of reducing the molding shrinkage of the resin composition before and after cured by heating.

The resin composition of the invention may contain a component other than the epoxy compound A and the epoxy compound B. For example, it is preferred that the resin composition contains a curing agent capable of reacting with the epoxy compound.

With respect to the curing agent, there is no particular limitation as long as it is capable of reacting with the epoxy compound, but examples of curing agents include amine compounds, acid anhydride compounds, amide compounds, phenol compounds, carboxylic acid compounds, and the above-mentioned hydroxy compound B.

Examples of amine compounds include aliphatic polyamines, such as ethylenediamine, propylenediamine, butylenediamine, hexamethylenediamine, polypropylene glycol diamine, diethylenetriamine, triethylenetetramine, and pentaethylenehexamine; aromatic polyamines, such as metaxylylenediamine, diaminodiphenylmethane, and phenylenediamine; alicyclic polyamines, such as 1,3-bis(aminomethyl)cyclohexane, isophoronediamine, and norbornanediamine; and dicyandiamide.

Examples of acid anhydride compounds include phthalic anhydride, trimellitic anhydride, pyromellitic anhydride, maleic anhydride, maleic anhydride polypropylene glycol, tetrahydrophthalic anhydride, methyltetrahydrophthalic anhydride, methylnadic anhydride, hexahydrophthalic anhydride, and methylhexahydrophthalic anhydride.

Examples of phenol compounds include a phenolic novolak resin, a cresol novolak resin, an aromatic hydrocarbon formaldehyde resin-modified phenolic resin, a dicyclopentadiene phenol addition resin, a phenolic aralkyl resin, a naphthol aralkyl resin, a trimethylolmethane resin, a tetraphenylolethane resin, a naphthol novolak resin, a naphthol-phenol copolycondensed novolak resin, a naphthol-cresol copolycondensed novolak resin, a biphenyl-modified phenolic resin, an aminotriazine-modified phenolic resin, and modification products thereof. Further, examples of latent catalysts include an imidazole, a BF3-amine complex, and a guanidine derivative.

Examples of amide compounds include an aliphatic polyamide synthesized from a polycarboxylic acid and a polyamine, an aromatic polyamide obtained by introducing an aromatic ring into the aliphatic polyamide, and an aliphatic polyamide adduct and an aromatic polyamide adduct, each having an epoxy compound added to a polyamide.

Examples of carboxylic acid compounds include carboxylic acid polymers, such as a carboxylic acid-end polyester, polyacrylic acid, and maleic acid-modified polypropylene glycol.

When the above curing agent is used, a single type of the curing agent may be used, or two or more types of the curing agents may be used in combination. In the use as an underfill or the like or in the use as a general coating composition, the above-mentioned amine compound, carboxylic acid compound, and/or acid anhydride compound is preferably used. Further, in the use as a bonding agent or a flexible wiring board, the amine compound, particularly, dicyandiamide is preferred from the viewpoint of the operation properties, curing properties, and long-term stability. Further, in the use as a semiconductor encapsulating material, from the viewpoint of heat resistance of the cured product, a phenol compound of a solid type is preferred.

<Other Epoxy Compounds>

In the resin composition of the invention, an epoxy compound other than the epoxy compound A and the epoxy compound B may be used in such an amount that the effects of the invention are not sacrificed. In this case, in the composition of the invention, the total amount of the epoxy compound A and the epoxy compound B in the whole of the epoxy compounds is preferably 30% by mass or more, especially preferably 40% by mass or more.

The usable epoxy compound is not limited as long as it is other than the epoxy compound A and the epoxy compound B, and examples of such epoxy compounds include liquid epoxy resins, such as a bisphenol A epoxy resin, a bisphenol F epoxy resin, a bisphenol S epoxy resin, a bisphenol AD epoxy resin, a polyhydroxybenzene epoxy resin, a polyhydroxynaphthalene epoxy resin, a biphenyl epoxy resin, and a tetramethylbiphenyl epoxy resin, brominated epoxy resins, such as a brominated phenolic novolak epoxy resin, and a solid bisphenol A epoxy resin, a phenolic novolak epoxy resin, a cresol novolak epoxy resin, a triphenylmethane epoxy resin, a tetraphenylethane epoxy resin, a dicyclopentadiene-phenol addition reaction epoxy resin, a phenolic aralkyl epoxy resin, a phenylene ether epoxy resin, a naphthylene ether epoxy resin, a naphthol novolak epoxy resin, a naphthol aralkyl epoxy resin, a naphthol-phenol copolycondensed novolak epoxy resin, a naphthol-cresol copolycondensed novolak epoxy resin, an aromatic hydrocarbon formaldehyde resin-modified phenolic resin-type epoxy resin, and a biphenyl-modified novolak epoxy resin, and these epoxy compounds may be used individually or in combination, and the epoxy compound is preferably appropriately selected according to the intended use and the physical properties of the cured product and the like.

With respect to the amounts of the epoxy compound and the curing agent incorporated into the composition of the invention, there is no particular limitation, but, from the viewpoint of the obtained cured product which has excellent mechanical physical properties and the like, the epoxy compound and the curing agent are preferably incorporated in such amounts that the amount of the active group in the curing agent is 0.4 to 1.5 equivalent, relative to 1 equivalent of the total of the epoxy group in the whole of the epoxy compounds including the epoxy compound A and the epoxy compound B.

<Curing Accelerator>

For example, the resin composition of the invention may contain a curing accelerator. With respect to the curing accelerator, those of various types can be used, but examples include an urea compound, a phosphorus compound, a tertiary amine, an imidazole, an organic acid metal salt, a Lewis acid, and an amine complex salt. When used as a bonding agent, from the viewpoint of excellent operation properties and cold curing properties, an urea compound, especially 3-(3,4-dichlorophenyl)-1,1-dimethylurea (DCMU) is preferred. When used as a semiconductor encapsulating material, from the viewpoint of excellent curing properties, heat resistance, electric properties, moisture resistance reliability and the like, triphenylphosphine is preferred as a phosphorus compound, and 1,8-diazabicyclo-[5.4.0]-undecene is preferred as a tertiary amine.

<Filler>

The resin composition of the invention may further contain a filler. Examples of fillers include inorganic fillers and organic fillers. Examples of inorganic fillers include inorganic fine particles.

With respect to the inorganic fine particles, examples of those having excellent heat resistance include alumina, magnesia, titania, zirconia, and silica (such as quartz, fumed silica, precipitated silica, silicic anhydride, fused silica, crystalline silica, and micronized amorphous silica); examples of those having excellent thermal conductivity include boron nitride, aluminum nitride, alumina oxide, titanium oxide, magnesium oxide, zinc oxide, silicon oxide, and diamond; examples of those having excellent electrical conductivity include a metallic filler and/or a metal-coated filler using a metal simple substance or alloy (for example, iron, copper, magnesium, aluminum, gold, silver, platinum, zinc, manganese, or stainless steel); examples of those having excellent barrier properties include minerals, such as mica, clay, kaolin, talc, zeolite, wollastonite, and smectite, potassium titanate, magnesium sulfate, sepiolite, xonotlite, aluminum borate, calcium carbonate, titanium oxide, barium sulfate, zinc oxide, and magnesium hydroxide; examples of those having a high refractive index include barium titanate, zirconia oxide, and titanium oxide; examples of those having photocatalytic properties include photocatalyst metals, such as titanium, cerium, zinc, copper, aluminum, tin, indium, phosphorus, carbon, sulfur, ruthenium, nickel, iron, cobalt, silver, molybdenum, strontium, chromium, barium, and lead, composites of the above metals, and oxides thereof; examples of those having excellent abrasion resistance include metals, and composites and oxides thereof, such as silica, alumina, zirconia, and magnesium oxide; examples of those having excellent electrical conductivity include metals, such as silver and copper, tin oxide, and indium oxide; examples of those having excellent insulation properties include silica; and examples of those having excellent ultraviolet light screening properties include titanium oxide and zinc oxide.

These inorganic fine particles may be appropriately selected according to the use, and a single type of the inorganic fine particles may be used, or two or more types of the inorganic fine particles may be used in combination. Further, the inorganic fine particles have various properties other than the properties mentioned above, and therefore may be appropriately selected according to the use.

For example, when silica is used as the inorganic fine particles, there is no particular limitation with respect to the silica, and known silica fine particles, such as silica in a powder form or colloidal silica, can be used. Examples of commercially available silica fine particles in a powder form include Aerosil 50, 200, manufactured by Nippon Aerosil Co., Ltd.; Sildex H31, H32, H51, H52, H121, H122, manufactured by AGC Inc.; E220A, E220, manufactured by Nippon Silica Industrial Co.; SYLYSIA 470, manufactured by Fuji Silysia Chemical Ltd.; and SG Flake, manufactured by Nippon Sheet Glass Co., Ltd.

Further, examples of commercially available colloidal silica include methanol silica sol, IPA-ST, MEK-ST, NBA-ST, XBA-ST, DMAC-ST, ST-UP, ST-OUP, ST-20, ST-40, ST-C, ST-N, ST-O, ST-50, ST-OL, manufactured by Nissan Chemical Industries, Ltd.

Surface-modified silica fine particles may be used, and, as examples of such silica fine particles, there can be mentioned those which are obtained by subjecting the above-mentioned silica fine particles to surface treatment with a reactive silane coupling agent having a hydrophobic group, and those which are obtained by modifying the silica fine particles with a compound having (a)an (meth)acryloyl group. Examples of commercially available powder-form silica modified with a compound having (a)an (meth)acryloyl group include Aerosil RM50, R711, manufactured by Nippon Aerosil Co., Ltd., and examples of commercially available colloidal silica modified with a compound having (a)an (meth)acryloyl group include MIBK-SD, manufactured by Nissan Chemical Industries, Ltd.

With respect to the shape of the silica fine particles, there is no particular limitation, and those in a spherical, hollow, porous, rod, plate, fibrous, or indefinite shape can be used. Further, the primary particle diameter of the silica fine particles is preferably in the range of from 5 to 200 nm. When the primary particle diameter is less than 5 nm, there is a possibility that dispersion of the inorganic fine particles in the dispersion becomes unsatisfactory, and, when the diameter is more than 200 nm, there is a possibility that a satisfactory strength of the cured product cannot be maintained.

With respect to the titanium oxide fine particles, not only a loading pigment but also an ultraviolet light responsive photocatalyst can be used, for example, anatase titanium oxide, rutile titanium oxide, brookite titanium oxide, or the like can be used. Further, there can be used titanium oxide particles which are designed to be responsive to a visible light by doping the crystal structure of titanium oxide with a different element. With respect to the element with which titanium oxide is doped, an anionic element, such as nitrogen, sulfur, carbon, fluorine, or phosphorus, or a cationic element, such as chromium, iron, cobalt, or manganese, is preferably used. Further, with respect to the form of the titanium oxide fine particles, those in the form of a powder, or in the form of a sol or slurry having the particles dispersed in an organic solvent or water can be used. Examples of commercially available titanium oxide fine particles in a powder form include Aerosil P-25, manufactured by Nippon Aerosil Co., Ltd., and ATM-100, manufactured by Tayca Corporation. Further, examples of commercially available titanium oxide fine particles in a slurry form include TKD-701, manufactured by Tayca Corporation.

<Fibrous Substrate>

The resin composition of the invention may further contain a fibrous substrate. With respect to the fibrous substrate in the invention, there is no particular limitation, but preferred is one which is for use in a fiber-reinforced resin, and examples include inorganic fibers and organic fibers.

Examples of inorganic fibers include inorganic fibers, such as a carbon fiber, a glass fiber, a boron fiber, an alumina fiber, and a silicon carbide fiber, a carbon fiber, an activated carbon fiber, a graphite fiber, a tungsten carbide fiber, a ceramic fiber, a natural fiber, a mineral fiber of basalt or the like, a boron nitride fiber, a boron carbide fiber, and a metallic fiber. Examples of the metallic fibers include an aluminum fiber, a copper fiber, a brass fiber, a stainless steel fiber, and a steel fiber.

Examples of organic fibers include synthetic fibers formed from a resin material, such as polybenzazole, aramid, PBO (polyparaphenylenebenzoxazole), polyphenylene sulfide, polyester, acryl, polyamide, polyolefin, polyvinyl alcohol, or polyarylate, natural fibers of cellulose, pulp, cotton, wool, or silk, and regenerated fibers of protein, polypeptide, alginic acid, or the like.

Of these, a carbon fiber and a glass fiber are preferred because they have a wide range of industrial applicability. Among these fibers, a single type of the fiber may be used, or two or more types of the fibers may be used in combination.

The fibrous substrate in the invention may be an aggregate of fibers, and the fiber may be continuous or discontinuous, and may be in a woven fabric form or a nonwoven fabric form. Further, the fibrous substrate may be a fiber bundle having fibers unidirectionally aligned, and may have a sheet form in which fiber bundles are arranged. Further, the fibrous substrate may have a steric form of a fiber aggregate having an increased thickness.

<Dispersing Medium>

In the resin composition of the invention, for the purpose of controlling the solids content or viscosity of the resin composition, a dispersing medium may be used. With respect to the dispersing medium, any liquid medium which does not adversely affect the effects of the invention can be used, and examples of such liquid media include various organic solvents and liquid organic polymers.

Examples of the organic solvents include ketones, such as acetone, methyl ethyl ketone (MEK), and methyl isobutyl ketone (MIBK); cyclic ethers, such as tetrahydrofuran (THF) and dioxolane; esters, such as methyl acetate, ethyl acetate, and butyl acetate; aromatic solvents, such as toluene and xylene; and alcohols, such as carbitol, cellosolve, methanol, isopropanol, butanol, and propylene glycol monomethyl ether, and these can be used individually or in combination, and, of these, methyl ethyl ketone is preferred from the viewpoint of the volatility during the application and the recovery of the solvent.

The above-mentioned liquid organic polymer is a liquid organic polymer which does not directly contribute to the curing reaction, and examples of such polymers include a carboxyl group-containing polymer modification product (FLOWLEN G-900, NC-500: Kyoeisha Chemical Co., Ltd.), an acrylic polymer (FLOWLENWK-20: Kyoeisha Chemical Co., Ltd.), an amine salt of a special modified phosphate (HIPLAAD ED-251: Kusumoto Chemicals Ltd.), and a modified acrylic block copolymer (DISPERBYK2000; BYK-Chemie GmbH).

<Resin>

Further, the resin composition of the invention may have a resin other than the various compounds mentioned above in the invention. With respect to the resin, any known resin commonly used may be incorporated into the composition as long as the effects of the invention are not sacrificed, and, for example, a thermosetting resin or a thermoplastic resin can be used.

The thermosetting resin means a resin having properties that it can be changed to be substantially insoluble and infusible upon being cured by a means, such as heating, radiation, or a catalyst. Specific examples of thermosetting resins include a phenolic resin, an urea resin, a melamine resin, a benzoguanamine resin, an alkyd resin, an unsaturated polyester resin, a vinyl ester resin, a diallyl terephthalate resin, a silicone resin, an urethane resin, a furan resin, a ketone resin, a xylene resin, a thermosetting polyimide resin, a benzoxazine resin, an active ester resin, an aniline resin, a cyanate ester resin, a styrene-maleic anhydride (SMA) resin, and a maleimide resin. These thermosetting resins may be used individually or in combination.

The thermoplastic resin means a resin which can be melt-molded by heating. Specific examples of thermoplastic resins include a polyethylene resin, a polypropylene resin, a polystyrene resin, a rubber modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactic acid resin, a polyphenylene ether resin, a modified polyphenylene ether resin, a polycarbonate resin, a polysulfone resin, a polyphenylene sulfide resin, a polyether imide resin, a polyether sulfone resin, a polyarylate resin, a thermoplastic polyimide resin, a polyamide-imide resin, a polyether ether ketone resin, a polyketone resin, a liquid crystalline polyester resin, a fluororesin, a syndiotactic polystyrene resin, and a cyclic polyolefin resin. These thermoplastic resins can be used individually or in combination.

<Other Ingredients>

The resin composition of the invention may have another ingredient. Examples of such ingredients include a catalyst, a polymerization initiator, an inorganic pigment, an organic pigment, a loading pigment, a clay mineral, a wax, a surfactant, a stabilizer, a flow modifier, a coupling agent, a dye, a leveling agent, a rheology control agent, an ultraviolet light absorber, an antioxidant, a flame retardant, a plasticizer, and a reactive diluent.

<Cured Product>

By curing the resin composition of the invention, a cured product can be obtained. When curing the resin composition, the resin composition may be cured at ordinary room temperature or by heating. A known curing catalyst commonly used can be used in curing the resin composition.

When heat-curing is conducted, the resin composition may be cured by heating one time, or may be cured through multiple heating steps.

When a curing catalyst is used, for example, there can be used an inorganic acid, such as hydrochloric acid, sulfuric acid, or phosphoric acid; an organic acid, such as p-toluenesulfonic acid, monoisopropyl phosphate, or acetic acid; an inorganic base, such as sodium hydroxide or potassium hydroxide; a titanate, such as tetraisopropyl titanate or tetrabutyl titanate; a compound containing various types of basic nitrogen atoms, such as 1,8-diazabicyclo[5.4.0]undecene-7 (DBU), 1,5-diazabicyclo[4.3.0]nonene-5 (DBN), 1,4-diazabicyclo[2.2.2]octane (DABCO), tri-n-butylamine, dimethylbenzylamine, monoethanolamine, imidazole, 2-ethyl-4-methyl-imidazole, 1-methylimidazole, or N,N-dimethyl-4-aminopyridine (DMAP); a quaternary ammonium salt, such as a tetramethylammonium salt, a tetrabutylammonium salt, or a dilauryldimethylammonium salt, wherein the quaternary ammonium salt has chloride, bromide, carboxylate, hydroxide, or the like as a counter anion; a tin carboxylate, such as dibutyltin diacetate, dibutyltin dioctoate, dibutyltin dilaurate, dibutyltin diacetylacetonate, tin octylate, or tin stearate; or an organic peroxide, such as benzoyl peroxide, cumene hydroperoxide, dicumyl peroxide, lauroyl peroxide, di-t-butyl peroxide, t-butyl hydroperoxide, methyl ethyl ketone peroxide, or t-butyl perbenzoate, or the like. The catalysts may be used individually or in combination.

Further, the composition of the invention can be cured by an active energy ray. In this case, as a polymerization initiator, a photocationic polymerization initiator may be used. As an active energy ray, a visible light, an ultraviolet light, an X-ray, an electron beam, or the like can be used.

Examples of photocationic polymerization initiators include arylsulfonium salts and aryliodonium salts, and specifically, an arylsulfonium hexafluorophosphate, an arylsulfonium hexafluoroantimonate, an arylsulfonium tetrakis(pentafluoro)borate, a tri (alkylphenyl) sulfonium hexafluorophosphate, or the like can be used. Photocationic polymerization initiators may be used individually or in combination.

<Laminate>

The cured product of the invention can be laminated on a substrate to obtain a laminate.

As a substrate for the laminate, an inorganic material, such as a metal or glass, or an organic material, such as a plastic or wood, may be appropriately selected according to the use of the laminate. With respect to the form of the laminate, the laminate may have a flat plate form, a sheet form, or a three-dimensional structure or a steric form. The laminate may have an arbitrary form according to the purpose, such as a form having curvature in the entire surface or part thereof. Further, with respect to the hardness, thickness and the like of the substrate, there is no limitation. Further, the cured product of the invention may be further laminated on the cured product of the invention which is used as a substrate.

Further, the laminate may be a multilayer laminate obtained by laminating a substrate, the cured product, and a second substrate in this order. The resin composition of the invention has excellent adhesion properties, and therefore can be advantageously used as a bonding agent for bonding the substrate and the second substrate.

The resin composition of the invention has especially high adhesion properties to a metal and/or a metal oxide, and therefore can be particularly advantageously used as a primer for metal. Examples of metals include copper, aluminum, gold, silver, iron, platinum, chromium, nickel, tin, titanium, zinc, various alloys, and composite materials thereof, and examples of metal oxides include a single oxide and/or a composite oxide of the above metals. The resin composition has especially excellent adhesive force to iron, copper, and aluminum, and therefore can be advantageously used as a bonding agent for iron, copper, and aluminum.

Further, the resin composition of the invention can relax stress, and hence can be particularly advantageously used in bonding different materials. For example, even in a laminate having different materials such that the substrate is a metal and/or a metal oxide and the second substrate is a plastic layer, the adhesive force can be maintained due to the stress relaxation ability of the resin composition.

In the laminate of the invention, the cured product may be formed by directly applying or directly molding the resin composition onto the substrate, or a molded layer of the resin composition may be laminated on the substrate. When directly applying the resin composition to the substrate, with respect to the method for application, there is no particular limitation, and examples of application methods include a spraying method, a spin coating method, a dipping method, a roll coating method, a blade coating method, a doctor roll method, a doctor blade method, a curtain coating method, a slit coating method, a screen printing method, and an ink-jet method. When directly molding the resin composition onto the substrate, examples of molding methods include in-mold molding, insert molding, vacuum molding, extrusion lamination, and press molding.

When the molded layer of the resin composition is laminated on the substrate, the lamination may be conducted in such a way that a layer of the uncured or semi-cured resin composition is laminated on the substrate and then cured, or in such a way that the cured product obtained by completely curing the composition is laminated on the substrate.

Further, lamination may be conducted by applying a precursor which can be a substrate to the cured product of the invention and curing the precursor, or a precursor which can be a substrate or the composition of the invention which is in an uncured or semi-cured state is bonded to the cured product and then cured. With respect to the precursor which can be a substrate, there is no particular limitation, and examples of such precursors include various types of curable resin compositions.

<Fiber-Reinforced Resin>

When the resin composition of the invention has a fibrous substrate wherein the fibrous substrate is a reinforcing fiber, the composition containing the fibrous substrate can be used as a fiber-reinforced resin.

With respect to the method for permitting the composition to contain the fibrous substrate, there is no particular limitation as long as the effects of the present invention are not sacrificed, and there can be mentioned a method in which a composite of the fibrous substrate and the composition is formed by a kneading, application, impregnation, injection, or contact bonding method or the like, and the method can be appropriately selected according to the form of the fiber and the use of the fiber-reinforced resin.

With respect to the method for molding the fiber-reinforced resin in the invention, there is no particular limitation. When a product in a plate form is produced, an extrusion molding method is generally used, but the product can be produced by flat press. In addition, an extrusion molding method, a blow molding method, a compression molding method, a vacuum molding method, an injection molding method, or the like can be used. Further, when a product in a film form is produced, a melt extrusion method or a solution casting method can be used, and, when using a melt-molding method, examples include inflation film molding, cast molding, extrusion lamination molding, calender molding, sheet molding, fiber molding, blow molding, injection molding, rotary molding, and cover molding. Further, in the case of the resin curable by an active energy ray, a cured product can be produced by various curing methods using an active energy ray. Particularly, when a thermosetting resin is used as a main component of a matrix resin, there can be mentioned a molding method in which a prepreg is formed from the molding material and heated under pressure by a press or an autoclave, and further examples include RTM (Resin Transfer Molding), VaRTM (Vacuum assist Resin Transfer Molding), lamination molding, and hand lay-up molding.

<Prepreg>

The fiber-reinforced resin in the invention can form a state which is called a prepreg that is uncured or semi-cured. A product in the state of prepreg may be distributed, and then finally cured to form a cured product. When forming a laminate, a prepreg is advantageous in that a prepreg is formed and subsequently other layers are laminated on the prepreg, and then finally cured, making it possible to form a laminate having the layers closely bonded to each other.

With respect to the mass ratio of the composition and fibrous substrate used in the prepreg, there is no particular limitation, but, generally, it is preferred that the prepreg is prepared so that the resin content of the prepreg is 20 to 60% by mass.

<Heat-Resistant Material and Electronic Material>

The resin composition of the invention is advantageous in that a cured product obtained from the resin composition has a high glass transition temperature and excellent resistance to thermal decomposition, and therefore can be advantageously used in heat-resistant members. Further, the resin composition has excellent adhesion to a substrate, and therefore can be especially advantageously used in electronic members. Particularly, the resin composition can be advantageously used in a semiconductor encapsulating material, a circuit board, a buildup film, a buildup substrate, a bonding agent, and a resist material. Further, the resin composition can be advantageously used in a matrix resin for a fiber-reinforced resin, and is particularly suitable for a high heat-resistant prepreg. The heat-resistant members and electronic members obtained from the resin composition can be advantageously used in various applications, and examples include industrial mechanical parts, general mechanical parts, parts for automobile, railway rolling stock and vehicles, aerospace and aircraft related parts, electronic and electric parts, building materials, container and packaging members, articles for daily use, sports and leisure goods, and housing members for wind power generation, but the use is not limited to these.

Hereinbelow, representative examples of the products are described.

1. Semiconductor Encapsulating Material

As examples of the method for obtaining a semiconductor encapsulating material from the resin composition of the invention, there can be mentioned a method in which the resin composition, a curing accelerator, and ingredients, such as an inorganic filler, are satisfactorily melt-mixed, if necessary, using an extruder, a kneader, a roll, or the like until the resultant mixture becomes uniform. In this instance, as an inorganic filler, generally, fused silica is used, but, when the semiconductor encapsulating material obtained from the resin composition is used as a high thermal-conductivity semiconductor encapsulating material for power transistor or power IC, crystalline silica having a higher thermal conductivity than that of fused silica, a high filling filler, such as alumina or silicon nitride, or fused silica, crystalline silica, alumina, silicon nitride, or the like may be used. With respect to the filling ratio of the inorganic filler, an inorganic filler is preferably used in an amount in the range of from 30 to 95% parts by mass, relative to 100 parts by mass of the curable resin composition, and, especially, for improving the flame retardancy, moisture resistance, or resistance to solder crack, or for reducing the coefficient of linear expansion, an inorganic filler is more preferably used in an amount of 70 parts by mass or more, further preferably 80 parts by mass or more.

2. Semiconductor Device

As semiconductor package molding for obtaining a semiconductor device from the curable resin composition of the invention, there can be mentioned a method in which the above-mentioned semiconductor encapsulating material is cast, or molded using a transfer molding machine, an injection molding machine, or the like, and further heated at 50 to 250° C. for 2 to 10 hours.

3. Printed Circuit Board

As a method for obtaining a printed circuit board from the composition of the invention, there can be mentioned a method in which the above-mentioned prepreg is laminated by a general method, and a copper foil is appropriately stacked thereon, and the resultant laminate is heat-pressed under a pressure of 1 to 10 MPa at 170 to 300° C. for 10 minutes to 3 hours.

4. Buildup Substrate

As a method for obtaining a buildup substrate from the composition of the invention, for example, there can be mentioned the following steps. First, the composition having appropriately incorporated a rubber, a filler, and the like is applied to a circuit board having a circuit formed thereon using a spray coating method, a curtain coating method, or the like, and then cured (step 1). Then, if necessary, a predetermined through hole portion or the like is formed in the resultant circuit board, and then the board is treated with a roughening agent, and the treated surface is washed with warm water to form an uneven surface, followed by plating with a metal, such as copper (step 2). A cycle of such operations is successively repeated if desired, so that the resin insulating layer and the conductor layer of a predetermined circuit pattern are alternately built up (step 3). The formation of the through hole portion is performed after the resin insulating layer as the outermost layer is formed. With respect to the buildup substrate in the invention, when a copper foil with a resin obtained by semi-curing the resin composition on a copper foil is heat-pressed at 170 to 300° C. onto a wiring board having a circuit formed thereon, the buildup substrate can be produced without the step for forming a roughened surface and plating treatment.

5. Buildup Film

With respect to the method for obtaining a buildup film from the composition of the invention, a buildup film can be produced by applying the composition to the surface of a support film (Y) which is a substrate, and further drying the organic solvent by heating, or heated air blowing or the like to form a layer (X) of the composition.

With respect to the organic solvent used, for example, a ketone, such as acetone, methyl ethyl ketone, or cyclohexanone, an acetate, such as ethyl acetate, butyl acetate, cellosolve acetate, propylene glycol monomethyl ether acetate, or carbitol acetate, a carbitol, such as cellosolve or butyl carbitol, an aromatic hydrocarbon, such as toluene or xylene, dimethylformamide, dimethylacetamide, N-methylpyrrolidone, or the like is preferably used, and further it is preferred that the organic solvent is used in such a ratio that the nonvolatile content becomes 30 to 60% by mass.

The thickness of the formed layer (X) is generally the thickness of the conductor layer or more. The conductor layer in the circuit board generally has a thickness in the range of from 5 to 70 µm, and therefore the resin composition layer preferably has a thickness of 10 to 100 µm. The layer (X) of the composition in the invention may be protected by the below-mentioned protective film. By protecting the layer by the protective film, it is possible to prevent the surface of the resin composition layer from suffering deposition of dirt or the like or formation of a flaw.

As examples of the above-mentioned support film and protective film, there can be mentioned polyolefins, such as polyethylene, polypropylene, and polyvinyl chloride, polyesters, such as polyethylene terephthalate (hereinafter, frequently referred to simply as "PET") and polyethylene naphthalate, polycarbonate, polyimide, and further release paper and metal foils, such as a copper foil and an aluminum foil. The support film and protective film may have been subjected to matt treatment, corona treatment, or release treatment. With respect to the thickness of the support film, there is no particular limitation, but, generally, the support film used has a thickness of 10 to 150 µm, preferably in the range of from 25 to 50 µm. Further, the protective film preferably has a thickness of 1 to 40 µm.

The above-mentioned support film (Y) is released after being laminated on a circuit board, or after an insulating layer is formed by heat-curing. When the support film (Y) is released after the curable resin composition layer constituting the buildup film is cured by heating, it is possible to prevent deposition of dirt or the like in the curing step. When the support film is released after curing the resin composition, generally, the support film is preliminarily subjected to release treatment.

Using the buildup film obtained as mentioned above, a multilayer printed circuit board can be produced. For example, when the layer (X) is protected by a protective film, these are released, and then laminated on one surface or both surfaces of a circuit board so that the layer (X) is directly in contact with the circuit board by, for example, a vacuum lamination method. The method for lamination may be conducted either in a batch-wise manner or in a continuous manner using a roll. Further, if necessary, before being laminated, the buildup film and circuit board may be heated (preheated). With respect to the conditions for lamination, the pressing temperature (lamination temperature) is preferably 70 to 140° C., and the pressing pressure is preferably 1 to 11 kgf/cm$^2$ (9.8×10$^4$ to 107.9×10$^4$ N/m$^2$), and the lamination is preferably performed under an air pressure of 20 mmHg (26.7 hPa) or less which is a reduced pressure.

6. Conductive Paste

As a method for obtaining a conductive paste from the composition of the invention, for example, there can be mentioned a method in which conductive particles are dispersed in the composition. Depending on the type of the conductive particles used in the conductive paste, the conductive paste can be used as a paste resin composition for circuit connection or an anisotropic conductive bonding agent.

EXAMPLES

Hereinbelow, the present invention will be described in more detail with reference to the following Examples and Comparative Examples, and, in the following Examples and Comparative Examples, "part(s)" and "%" are given by mass unless otherwise specified.

The measurement of $^1$H- and $^{13}$C-NMR, FD-MS spectrum, and GPC was conducted under the conditions shown below.
$^1$H-NMR: "JNM-ECA600", manufactured by JEOL RESONANCE Inc.
Magnetic field strength: 600 MHz
Accumulation times: 32
Solvent: DMSO-$d_6$
Sample concentration: 30% by mass
$^{13}$C-NMR: "JNM-ECA600", manufactured by JEOL RESONANCE Inc.
Magnetic field strength: 150 MHz
Accumulation times: 320
Solvent: DMSO-$d_6$
Sample concentration: 30% by mass
FD-MS: "JMS-T100GC AccuTOF", manufactured by JEOL Ltd.
Measuring range: m/z=50.00 to 2,000.00
Rate of change: 25.6 mA/min
Final current: 40 mA
Cathode voltage: −10 kV
GPC: "HLC-8320GPC", manufactured by Tosoh Corp.
Columns: "TSK-GEL G2000HXL"+"TSK-GEL G3000HXL"+"TSK-GEL G4000HXL", manufactured by Tosoh Corp.
Detector: RI (differential refractometer)
Conditions for measurement: 40° C.
Mobile phase: Tetrahydrofuran
Flow rate: 1 ml/min
Standard: "PStQuick A", "PStQuick B", "PStQuick E", "PStQuick F", manufactured by Tosoh Corp.

With respect to the epoxy equivalent of the synthesized epoxy compound, the measurement was made in accordance with JIS K7236 to determine an epoxy equivalent (g/eq).

As examples of the method for determining the number of repeating units, there can be mentioned GPC molecular weight measurement, and determination from the results of an appropriate type of instrumental analysis, such as FD-MS or NMR.

[Synthesis Example 1] C12 Type (BPA) Hydroxy Compound Ph-1

Into a flask equipped with a thermometer and a stirrer were charged 210 g (0.5 mol) of a diglycidyl ether of 1,12-dodecanediol (manufactured by Yokkaichi Chemical Co., Ltd.; epoxy equivalent: 210 g/eq) and 119.7 g (0.53 mol) of bisphenol A (hydroxyl equivalent: 114 g/eq), and the temperature of the resultant mixture was increased to 140° C. over 30 minutes, and then 3.2 g of a 20% aqueous solution of sodium hydroxide was charged into the flask. Then, the temperature of the resultant mixture was increased to 150° C. over 30 minutes, and further the reaction was conducted at 150° C. for 16 hours. Subsequently, sodium phosphate in an amount required for neutralization was added to obtain 320 g of a hydroxy compound (Ph-1). With respect to the obtained hydroxy compound (Ph-1), in a mass spectrum, a peak of M+=771, which corresponds to the theoretical structure of the structural formula (b-1) wherein m=1, and n=12, was obtained. From this, it was found that the hydroxy compound (Ph-1) contained a hydroxy compound having a structure represented by the structural formula (b-1). The hydroxyl equivalent of the hydroxy compound (Ph-1) determined from NMR and GPC was 2,000 g/eq, and an average of m in the structural formula (b-1), determined from the hydroxyl equivalent, was 6.9.

[Synthesis Example 2] C12 Type (BPA) Hydroxy Compound Ph-2

A reaction was conducted in substantially the same manner as in Synthesis Example 1 except that 3.2 g of the 20% aqueous solution of sodium hydroxide used in Synthesis Example 1 was changed to 1.6 g of a 4% aqueous solution of sodium hydroxide, obtaining 321 g of a hydroxy compound (Ph-2). With respect to the obtained hydroxy compound (Ph-2), in a mass spectrum, a peak of M+=771, which corresponds to the theoretical structure of the structural formula (b-1) wherein m=1, and n=12, was obtained. From this, it was found that the hydroxy compound (Ph-2) contained a hydroxy compound having a structure represented by the structural formula (b-1). The hydroxyl equivalent of the hydroxy compound (Ph-2) determined from NMR and GPC was 850 g/eq, and an average of m in the structural formula (b-1) was 4.2.

[Synthesis Example 3] C15 Type (BPA) Hydroxy Compound Ph-3

A reaction was conducted in substantially the same manner as in Synthesis Example 1 except that 210 g (0.5 mol) of the diglycidyl ether of 1,12-dodecanediol (epoxy equivalent: 210 g/eq) used in Synthesis Example 1 was changed to 236 g (0.5 mol) of a diglycidyl ether of 1,15-pentadecanediol (epoxy equivalent: 236 g/eq), obtaining 340 g of a hydroxy compound (Ph-3). With respect to the obtained hydroxy compound (Ph-3), in a mass spectrum, a peak of M+=813, which corresponds to the theoretical structure of the structural formula (b-1) wherein m=1, and n=15, was obtained. From this, it was found that the hydroxy compound (Ph-3) contained a hydroxy compound having a structure represented by the structural formula (b-1). The hydroxyl equivalent of the hydroxy compound (Ph-3) determined from NMR and GPC was 2,130 g/eq, and an average of m in the structural formula (b-1) was 6.9.

[Synthesis Example 4] C12 Type (BPA) Hydroxy Compound Ph-4

A reaction was conducted in substantially the same manner as in Synthesis Example 1 except that 119.7 g (0.53 mol) of the bisphenol A (hydroxyl equivalent: 114 g/eq) used in Synthesis Example 1 was changed to 228 g (1.0 mol) of bisphenol A (hydroxyl equivalent: 114 g/eq), obtaining 420 g of a hydroxy compound (Ph-4). With respect to the obtained hydroxy compound (Ph-4), in a mass spectrum, a peak of M+=771, which corresponds to the theoretical structure of the structural formula (b-1) wherein m=1, and n=12, was obtained. From this, it was found that the hydroxy compound (Ph-4) contained a hydroxy compound having a structure represented by the structural formula (b-1). The hydroxyl equivalent of the hydroxy compound (Ph-4) determined from NMR and GPC was 340 g/eq, and an average of m in the structural formula (b-1) was 0.9.

[Synthesis Example 5] C9 Type (BPA) Hydroxy Compound Ph-5

A reaction was conducted in substantially the same manner as in Synthesis Example 1 except that 210 g (0.5 mol) of the diglycidyl ether of 1,12-dodecanediol (epoxy equivalent: 210 g/eq) used in Synthesis Example 1 was changed to 190 g (0.5 mol) of a diglycidyl ether of 1,9-nonanediol (epoxy equivalent: 190 g/eq), obtaining 305 g of a hydroxy compound (Ph-5). With respect to the obtained hydroxy compound (Ph-5), a mass spectrum was measured and, as a result, a peak of M+=729, which corresponds to a comparative compound 1 that is a hydroxy compound having the theoretical structure of the structural formula (b-1) wherein m=1, and n=9, was obtained. From this, it was found that the hydroxy compound (Ph-5) contained the above-mentioned comparative compound 1 having the theoretical structure. The hydroxyl equivalent of the hydroxy compound (Ph-5) determined from NMR and GPC was 1,900 g/eq, and an average of m in the structural formula (b-1) was 7.2.

[Synthesis Example 6] C6 Type (BPA) Hydroxy Compound Ph-6

A reaction was conducted in substantially the same manner as in Synthesis Example 1 except that 210 g (0.5 mol) of the diglycidyl ether of 1,12-dodecanediol (epoxy equivalent: 210 g/eq) used in Synthesis Example 1 was changed to 160 g (0.5 mol) of a diglycidyl ether of 1,6-hexanediol (epoxy equivalent: 160 g/eq), obtaining 270 g of a hydroxy compound (Ph-6). With respect to the obtained hydroxy compound (Ph-6), a mass spectrum was measured and, as a result, a peak of M+=687, which corresponds to a comparative compound 2 that is a hydroxy compound having the theoretical structure of the structural formula (b-1) wherein m=1, and n=6, was obtained. From this, it was found that the hydroxy compound (Ph-6) contained the above-mentioned comparative compound 2 having the theoretical structure. The hydroxyl equivalent of the hydroxy compound (Ph-6) determined from NMR and GPC was 1,890 g/eq, and an average of m in the structural formula (b-1) was 7.7.

[Synthesis Example 7] Epoxy Compound Ep-1 of Ph-1

Into a flask equipped with a thermometer, a dropping funnel, a condenser, and a stirrer were charged 200 g of the hydroxy compound Ph-1 obtained in Synthesis Example 1, 437 g (4.72 mol) of epichlorohydrin, and 118 g of n-butanol, while purging the flask with nitrogen gas, so that the compound was dissolved. The temperature of the resultant solution was increased to 65° C., and then the pressure was reduced to a pressure under which an azeotrope was formed, and 6.66 g (0.08 mol) of a 49% aqueous solution of sodium hydroxide was dropwise added to the solution over 5 hours. Then, the resultant mixture was stirred under the same conditions for 0.5 hour. During the stirring, the distillate distilled off by azeotropic distillation was separated by means of a Dean-Stark trap, and the reaction was conducted while removing the aqueous layer and returning the oil layer into the reaction system. Then, the unreacted epichlorohydrin was distilled off by vacuum distillation. To the resultant crude epoxy resin were added 150 g of methyl isobutyl ketone and 150 g of n-butanol, dissolving the resin. Further, to the resultant solution was added 10 g of a 10% aqueous solution of sodium hydroxide, and the resultant mixture was subjected to reaction at 80° C. for 2 hours, and then washed with 50 g of water three times until the pH of the washing water was neutral. Then, the inside of the reaction system was dehydrated by azeotropic distillation, and subjected to microfiltration, and then the solvent was distilled off under a reduced pressure to obtain 190 g of an epoxy compound Ep-1. The obtained epoxy compound Ep-1 had an epoxy equivalent of 2,320 g/eq. With respect to the epoxy resin (Ep-1), in a mass spectrum, a peak of M+=883, which corresponds to the theoretical structure of the structural formula (A-1) wherein m=1, n=12, p1=0, p2=0, and q=1, was obtained. From this, it was found that the epoxy resin (Ep-1) contained an epoxy resin having a structure represented by the structural formula (A-1). The obtained epoxy resin (Ep-1) contained a compound of the structural formula (A-1) wherein q=0, and, from GPC, it was found that the compound of the structural formula (A-1) wherein q=0 was contained in the mixture in a content of 0.7% by mass, and an average of m in the structural formula (A-1) was 8.0.

[Synthesis Example 8] Epoxy Compound Ep-2 of Ph-2

A reaction was conducted in substantially the same manner as in Synthesis Example 7 except that 200 g of the hydroxy compound Ph-1 obtained in Synthesis Example 1 was changed to 200 g of the hydroxy compound Ph-2 obtained in Synthesis Example 2, obtaining 180 g of an epoxy compound Ep-2. The obtained epoxy compound Ep-2 had an epoxy equivalent of 1,040 g/eq. With respect to the epoxy resin (Ep-2), in a mass spectrum, a peak of M+=883, which corresponds to the theoretical structure of the structural formula (A-1) wherein m=1, n=12, p1=0, p2=0, and q=1, was obtained. From this, it was found that the epoxy resin (Ep-2) contained an epoxy resin having a structure represented by the structural formula (A-1). The obtained epoxy resin (Ep-2) contained a compound of the structural formula (A-1) wherein q=0, and, from GPC, it was found that the compound of the structural formula (A-1) wherein q=0 was contained in the mixture in a content of 2.7% by mass, and an average of m in the structural formula (A-1) was 3.2.

[Synthesis Example 9] Epoxy Compound Ep-3 of Ph-3

A reaction was conducted in substantially the same manner as in Synthesis Example 7 except that 200 g of the hydroxy compound Ph-1 obtained in Synthesis Example 1 was changed to 200 g of the hydroxy compound Ph-3 obtained in Synthesis Example 3, obtaining 190 g of an epoxy compound Ep-3. The obtained epoxy compound Ep-3 had an epoxy equivalent of 2,510 g/eq. With respect to the epoxy resin (Ep-3), in a mass spectrum, a peak of M+=925, which corresponds to the theoretical structure of the structural formula (A-1) wherein m=1, n=15, p1=0, p2=0, and q=1, was obtained. From this, it was found that the epoxy resin (Ep-3) contained an epoxy resin having a structure represented by the structural formula (A-1). The obtained epoxy resin (Ep-3) contained a compound of the structural formula (A-1) wherein q=0, and, from GPC, it was found that the compound of the structural formula (A-1) wherein q=0 was contained in the mixture in a content of 0.8% by mass, and an average of m in the structural formula (A-1) was 8.0.

[Synthesis Example 10] Epoxy Compound Ep-4 of Ph-4

A reaction was conducted in substantially the same manner as in Synthesis Example 7 except that 200 g of the hydroxy compound Ph-1 obtained in Synthesis Example 1 was changed to 200 g of the hydroxy compound Ph-4 obtained in Synthesis Example 4, obtaining 205 g of an epoxy compound Ep-4. The obtained epoxy compound Ep-4 had an epoxy equivalent of 461 g/eq. With respect to the epoxy resin (Ep-4), in a mass spectrum, a peak of M+=883, which corresponds to the theoretical structure of the structural formula (A-1) wherein m=1, n=12, p1=0, p2=0, and q=1, was obtained. From this, it was found that the epoxy resin (Ep-4) contained an epoxy resin having a structure represented by the structural formula (A-1). The obtained epoxy resin (Ep-4) contained a compound of the structural formula (A-1) wherein q=0, and, from GPC, it was found that the compound of the structural formula (A-1) wherein q=0 was contained in the mixture in a content of 20.5% by mass, and an average of m in the structural formula (A-1) was 1.1.

[Synthesis Example 11] Epoxy Compound Ep-5 of Ph-5

A reaction was conducted in substantially the same manner as in Synthesis Example 7 except that 200 g of the hydroxy compound Ph-1 obtained in Synthesis Example 1 was changed to 200 g of the hydroxy compound Ph-5 obtained in Synthesis Example 5, obtaining 192 g of an epoxy compound Ep-5. The obtained epoxy compound Ep-5 had an epoxy equivalent of 2,250 g/eq. With respect to the epoxy resin (Ep-5), a mass spectrum was measured and, as a result, a peak of M+=841, which corresponds to a comparative compound 3 that is an epoxy compound having the theoretical structure of the structural formula (A-1) wherein m=1, n=9, p1=0, p2=0, and q=1, was obtained. From this, it was found that the epoxy resin (Ep-5) contained the above-mentioned comparative compound 3 having the theoretical structure. The obtained epoxy resin (Ep-5) contained a compound of the structural formula (A-1) wherein q=0, and, from GPC, it was found that the compound of the structural formula (A-1) wherein q=0 was contained in the mixture in a content of 0.9% by mass, and an average of m in the structural formula (A-1) was 8.3.

[Synthesis Example 12] Epoxy Compound Ep-6 of Ph-6

A reaction was conducted in substantially the same manner as in Synthesis Example 7 except that 200 g of the hydroxy compound Ph-1 obtained in Synthesis Example 1 was changed to 200 g of the hydroxy compound Ph-6 obtained in Synthesis Example 6, obtaining 189 g of an epoxy compound Ep-6. The obtained epoxy compound Ep-6 had an epoxy equivalent of 2,244 g/eq. With respect to the epoxy resin (Ep-6), a mass spectrum was measured and, as a result, a peak of M+=799, which corresponds to a comparative compound 4 that is an epoxy compound having the theoretical structure of the structural formula (A-1) wherein m=1, n=6, p1=0, p2=0, and q=1, was obtained. From this, it was found that the epoxy resin (Ep-6) contained the above-mentioned comparative compound 4 having the theoretical structure. The obtained epoxy resin (Ep-6) contained a compound of the structural formula (A-1) wherein q=0, and, from GPC, it was found that the compound of the structural formula (A-1) wherein q=0 was contained in the mixture in a content of 0.8% by mass, and an average of m in the structural formula (A-1) was 9.1.

[Examples 1 to 7 and Comparative Examples 1 to 9] Preparation of a Composition and a Resin Cured Product In accordance with the formulation shown in Tables 1 and 2, an epoxy resin, a curing agent (1.0 equivalent relative to the epoxy), a curing accelerator (0.85 part by weight relative to the epoxy), and a filler (light calcium carbonate, manufactured by Ohmi Chemical Industry Co., Ltd.) were uniformly mixed by means of a mixer ("THINKY MIXER ARV-200", manufactured by THINKY Corporation) to obtain an epoxy resin composition. The obtained epoxy resin composition was placed between aluminum specular surface plates ("JIS H 4000 A1050P", manufactured by Engineering Test Service Co., Ltd.) using a silicone tube as a spacer, and cured by heating at 170° C. for 30 minutes to obtain a resin cured product having a thickness of 0.8 mm.

<Glass Transition Temperature>

The cured product having a thickness of 0.8 mm was cut into a size having a width of 5 mm and a length of 40 mm, and this cut piece was used as a test specimen. With respect to the test specimen, using a viscoelasticity measuring apparatus (DMA: solid viscoelasticity measuring apparatus "DMS7100", manufactured by Hitachi High-Tech Science Corporation; deformation mode: pull; measurement mode: sinusoidal vibration; frequency: 1 Hz; temperature elevation rate: 3° C./minute), a temperature at which a change of the modulus was maximum (tan δ change rate was the largest) was evaluated as a glass transition temperature.

<Tensile Test>

The resin cured product was punched into a dumbbell shape (JIS K 7161-2-1BA) using a punch cutter, and this dumbbell was used as a test specimen. With respect to the test specimen, using a tensile tester ("Autograph AG-IS", manufactured by Shimadzu Corporation), a tensile test was conducted in accordance with JIS K 7162-2, and an elongation at break in a measurement environment at 23° C. was evaluated (test rate: 2 mm/min).

<Tensile Shear Test>

The resin composition was applied to one of two cold-rolled steel plates ("SPCC-SB", manufactured by TP Giken Co., Ltd.; 1.0 mm×25 mm×100 mm), and glass beads ("J-80", manufactured by Potters-Ballotini Co., Ltd.) were added as a spacer, and another SPCC-SB was put thereon (bond area: 25 mm×12.5 mm). The resultant material was cured by heating at 170° C. for 30 minutes to obtain a test specimen. The adhesion properties were evaluated by conducting a tensile shear test using the obtained test specimen. The test was conducted in accordance with JIS K 6850, and a comparison was made in respect of the maximum stress in a measurement environment at −40° C., 23° C., or 80° C.

<T-Peel Test>

The resin composition was applied to one of two cold-rolled steel plates ("SPCC-SB", manufactured by TP Giken Co., Ltd.; 0.5 mm×25 mm×200 mm), and glass beads ("J-80", manufactured by Potters-Ballotini Co., Ltd.) were added as a spacer, and another SPCC-SB was put thereon (bond area: 25 mm×150 mm). The resultant material was cured by heating at 170° C. for 30 minutes to obtain a test specimen. The adhesion properties were evaluated by conducting a T-peel test using the obtained test specimen. The test was conducted in accordance with JIS K 6854-3, and a comparison was made in respect of the average stress in a measurement environment at −40° C., 23° C., or 80° C.

<Observation of a Phase Separation Structure>

A cross-section of the resin cured product was prepared using an ultramicrotome, and observation of a phase separation structure was conducted. The observation was conducted by a method using a scanning electron microscope (SEM) and an atomic force microscope (AFM). By the observation by a SEM, it is possible to find out whether or not the cured product has a phase separation structure therein. When the cured product had a phase separation structure which forms an "island-in-sea" configuration, a particle diameter of the "island" portion was measured. With respect to the determination of an average of the particle diameters, 50 "island" portions were arbitrarily extracted from the "island" portions in the 200 μm×260 μm field of view, and particle diameters of the extracted "island" portions were measured, and an average particle diameter was determined. Further, from the observation by an AFM, a relative hardness distribution of the "sea" portion and the "island" portion can be found.
(SEM)
Type of the apparatus used: JSM-7800F, manufactured by JEOL Ltd.
Accelerating voltage: 5 kV
(AFM)
Type of the apparatus used: NANO Scope (R)IIIa, manufactured by Bruker AXS K.K.
Measurement mode: DFM
Cantilever: Si-DF20
Type of the image measured: topography image, phase image
<Measurement of a Molding Shrinkage>

A molding shrinkage of the epoxy resin composition was determined from: (Specific gravity after cured−Specific gravity before cured)≥Specific gravity after cured×100. The specific gravity after cured and specific gravity before cured were measured in accordance with JIS K7112 with respect to the specimen in water at 23° C.

TABLE 1

| | | | Examples | | | | | | |
|---|---|---|---|---|---|---|---|---|---|
| | | | 1 | 2 | 3 | 4 | 5 | 6 | 7 |
| Epoxy resin | Epoxy compound A | Ep-1 | 55 | 38 | 67 | | | 67 | 67 |
| | | Ep-2 | | | | 55 | | | |
| | | Ep-3 | | | | | 55 | | |
| | Epoxy compound B | E-850S | 45 | 62 | 33 | 45 | 45 | 33 | 33 |
| | Filler | CaCO3 | | | | | | 11.2 | 26.3 |
| | Curing agent | DICY | 5.5 | 7.3 | 4.2 | 6.2 | 5.5 | 4.2 | 4.2 |
| | Curing accelerator | DCMU | 0.85 | 0.85 | 0.85 | 0.85 | 0.85 | 0.85 | 0.85 |
| | Glass transition temperature (° C.) | | 25, 133 | 19, 98, 132 | 151, 28 | 58, 114 | 20, 130 | 17, 131 | 17, 130 |
| Tensile test | Elongation at break (%) | | 73 | 12 | 105 | 51 | 70 | 95 | 95 |
| Tensile shear test | Maximum stress (MPa) | −40° | 25.5 | 22.3 | 28.1 | 23.4 | 28.1 | 20.1 | 28.5 |
| | | 23° | 19.4 | 16 | 17.1 | 21.3 | 14.1 | 17.9 | 16.6 |
| | | 80° C. | 5.7 | 9.8 | 4.7 | 6.1 | 4.5 | 4.1 | 4.1 |
| T-peel test | Average stress (N/mm) | −40° | 1.2 | 1.2 | 1.7 | 1.2 | 1.1 | 1.3 | 1.3 |
| | | 23° C. | 4.3 | 2.5 | 7.8 | 3.9 | 2.9 | 6.6 | 7.9 |
| | | 80° C. | 2.8 | 1.1 | 4.8 | 1.5 | 1.2 | 3.4 | 2.6 |
| Phase separation | Configuration | | Island-in-sea | Island-in-sea | Island-in-sea | Island-in-sea | Island-in-sea | Island-in-sea | Island-in-sea |
| | Particle diameter (μm) | | 1.1 | 2.1 | 1.1 | 0.7 | 1.2 | 1.2 | 1.1 |
| Molding shrinkage (%) | | | 3.2 | 3.4 | 3 | 3.4 | 3.3 | 2.5 | 2.4 |

TABLE 2

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Epoxy resin | Epoxy compound A | Ep-1 | 100 | | | | | | | 55 | |
| | Epoxy compound B | E-850S | | 100 | | 33 | 45 | 45 | 45 | | 100 |
| | Epoxy compound other than A and B | Ep-4 | | | 100 | 67 | | | | | |
| | | Ep-5 | | | | | | 55 | | | |
| | | Ep-6 | | | | | | | 55 | | |
| | | HM-091 | | | | | 55 | | | 45 | |
| | Filler | CaCO3 | | | | | | | | | 28 |
| | Curing agent | DICY | 0.9 | 11.1 | 4.57 | 6.6 | 5.5 | 5.5 | 5.5 | 5.5 | 5.5 |
| | Curing accelerator | DCMU | 0.85 | 0.85 | 0.85 | 0.85 | 0.85 | 0.85 | 0.85 | 0.85 | 0.85 |
| | Glass transition temperature (° C.) | | — | 149 | 50 | 78 | — | 41, 131 | 70 | — | 1.42 |
| Tensile test | Elongation at break (%) | | — | <1 | 127 | 4.7 | — | 41 | 23 | — | 1.8 |
| Tensile shear test | Maximum stress (MPa) | −40° | — | 11.9 | 19.2 | 24.8 | — | 20.1 | 18.9 | — | 18.4 |
| | | 23° C. | — | 12.8 | 21.9 | 21.3 | — | 13.3 | 13.2 | — | 17.4 |
| | | 80° C. | — | 13.1 | <1 | 3.9 | — | 3.9 | 4.1 | — | 17.1 |
| T-peel test | Average stress (N/mm) | −40° C. | — | <1 | <1 | <1 | — | <1 | <1 | — | 1< |
| | | 23° C. | — | <1 | 1.8 | <1 | — | <1 | <1 | — | 1.4 |
| | | 80° C. | — | <1 | <1 | <1 | — | <1 | <1 | — | 1.5 |

TABLE 2-continued

| | | Comparative Examples | | | | | | | | |
|---|---|---|---|---|---|---|---|---|---|---|
| | | 1 | 2 | 3 | 4 | 5 | 6 | 7 | 8 | 9 |
| Phase separation | Configuration | — | None | None | None | — | Island-in-sea | None | — | None |
| | Particle diameter (μm) | — | — | — | — | — | 0.9 | — | — | — |
| Molding shrinkage (%) | | — | 4.6 | 4.8 | 4.6 | — | 3.9 | 4.5 | — | 4.2 |

The materials used shown in the tables are as follows.
E-850S: Bisphenol A epoxy resin (manufactured by DIC Corporation; epoxy equivalent: 188 g/eq)
HM-091: Bisphenol A epoxy resin (manufactured by DIC Corporation; epoxy equivalent: 2,340 g/eq)
$CaCO_3$: Light calcium carbonate (manufactured by Ohmi Chemical Industry Co., Ltd.)
DICY: Dicyandiamide ("DICY7", manufactured by Mitsubishi Chemical Corporation)
DCMU: 3-(3,4-Dichlorophenyl)-1,1-dimethylurea ("B-605-IM", manufactured by DIC Corporation)

As can be seen from Examples 1 to 7, the resin composition of the present invention has high elongation in the tensile test and excellent adhesion properties at ordinary room temperature and in a high temperature region, and further has a low molding shrinkage upon heat-curing of the resin composition.

With respect to Comparative Example 1, the composition was not cured, so that the evaluation could not be made.

With respect to Comparative Examples 5 and 8, the resin had too high viscosity to prepare a composition having blended the resin, so that the evaluation could not be made. When heating the resin for softening it, curing of the resin proceeded during the blending, so that the evaluation could not be made.

INDUSTRIAL APPLICABILITY

The resin composition of the present invention containing the epoxy compound A and the epoxy compound B and the bonding agent can provide a flexible cured product which has both high elongation such that the cured product undergoes elastic deformation, and high adhesion properties such that the cured product is resistant to a thermal expansion difference with a substrate. Particularly, the resin composition of the invention can be advantageously used in advanced electronic materials, such as a bonding agent for structural material, a semiconductor encapsulating material, and an insulating layer for multilayer printed board.

What is claimed is:

1. A resin composition containing an epoxy compound A having a structure of the general formula (1) below and having an epoxy equivalent in the range of from 500 to 10,000 g/eq, an epoxy compound B having an epoxy equivalent in the range of from 100 to 300 g/eq, and a curing agent:

$$R_3-Ar-\left[\left[O\underset{R_9}{\overset{R_5}{\bigwedge}}O-Ar\right]_{p1}\left[O\underset{R_{10}}{\overset{R_6}{\bigwedge}}O-\underset{R_2}{\overset{R_1}{\underset{|}{C}}}\right)_n\right]$$

(1)

-continued $$-O\underset{R_{11}}{\overset{R_7}{\bigwedge}}O-Ar\left[O\underset{R_{12}}{\overset{R_8}{\bigwedge}}O-Ar\right]_{p2}\bigg\}_2 R_4$$

wherein, in the formula (1), each Ar independently represents a structure having an aromatic ring being unsubstituted or having a substituent, each of $R_1$ and $R_2$ independently represents a hydrogen atom or an alkyl group having 1 or 2 carbon atoms, each of $R_3$ to $R_8$ independently represents a hydroxyl group, a glycidyl ether group and/or a 2-methylglycidyl ether group, wherein at least one of $R_3$ to $R_8$ is a glycidyl ether group or a 2-methylglycidyl ether group, each of $R_9$ to $R_{12}$ independently represents a hydrogen atom or a methyl group, n is an integer of 11 to 16, and m, $p_1$, $p_2$, and q are an average of the number of repeating units, and m is 0.5 to 25, each of $p_1$ and $p_2$ is independently 0 to 5, and q represents 0.5 to 5, wherein the individual repeating units present in the repeating units of the structure are the same or different.

2. The resin composition according to claim 1, wherein the weight ratio of the epoxy compound A and the epoxy compound B is 97:3 to 3:97.

3. The resin composition according to claim 1, wherein, in the formula (1), $R_3$ and $R_4$ are a glycidyl ether group.

4. The resin composition according to claim 1, wherein, in the formula (1), each Ar is independently any one of the structures represented by the following formula (2):

(2)

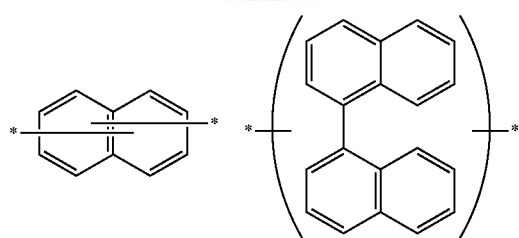
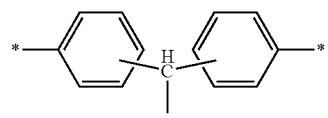
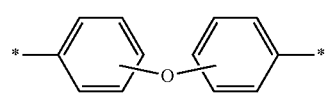
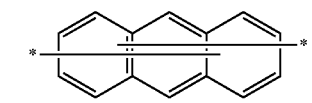
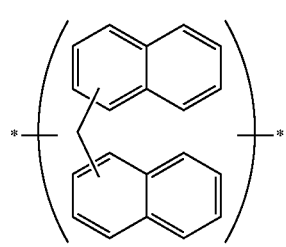
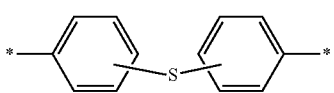
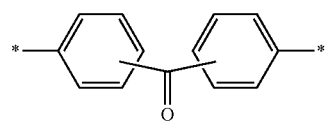
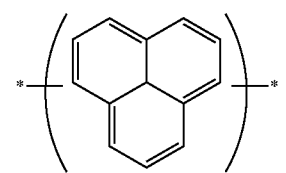
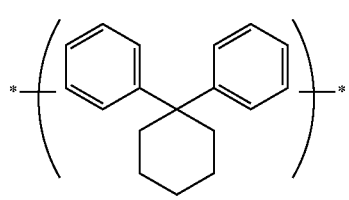
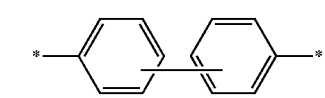
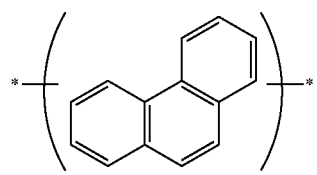
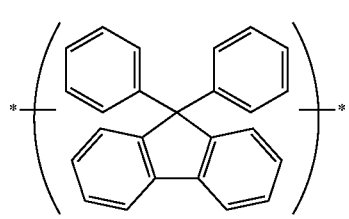
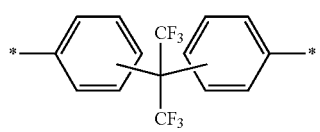
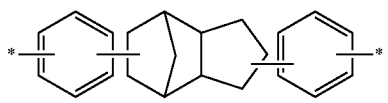
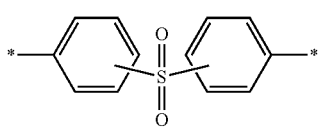

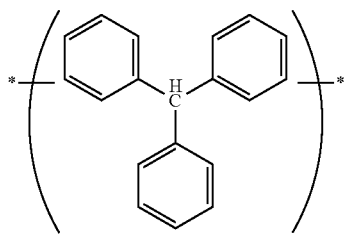

wherein, in the formula (2), the aromatic ring is substituted or unsubstituted, and * represents a bonding site.

5. The resin composition according to claim 1, wherein, in the formula (1), Ar is substituted by a glycidyl ether group and/or a 2-methylglycidyl ether group.

6. The resin composition according to claim 1, which is a bonding agent.

7. A cured product which is obtained by curing the resin composition according to claim 1.

8. The cured product according to claim 7, wherein the cured product containing resin particles having an average particle diameter of 10 nm to 100 μm, and a matrix resin, wherein the resin particles are a cured product of the epoxy compound A having the structure of the general formula (1) above and having the epoxy equivalent in the range of from 500 to 10,000 g/eq, and the matrix resin is a cured product of the epoxy compound B having the epoxy equivalent in the range of from 100 to 300 g/eq.

9. The cured product according to claim 7, wherein the cured product containing resin particles having an average particle diameter of 10 nm to 100 μm, and a matrix resin, wherein the resin particles are a cured product of the epoxy compound B having the epoxy equivalent in the range of from 100 to 300 g/eq, and the matrix resin is a cured product of the epoxy compound A having the structure of the general formula (1) above and having the epoxy equivalent in the range of from 500 to 10,000 g/eq.

10. A laminate obtained by laminating a substrate, the cured product according to claim 7, and a second substrate in this order, wherein the substrate is a metal or a metal oxide, and the second substrate is a plastic layer.

11. A laminate having a substrate and the cured product according to claim 7.

12. The laminate according to claim 11, wherein the substrate is a metal or a metal oxide.

13. An electronic member comprising the laminate according to claim 11.

14. A cured product which is obtained by curing a resin composition, wherein the resin composition contains an epoxy compound A having a structure of the general formula (1) below and having an epoxy equivalent in the range of from 500 to 10,000 g/eq, an epoxy compound B having an epoxy equivalent in the range of from 100 to 300 g/eq, and a curing accelerator:

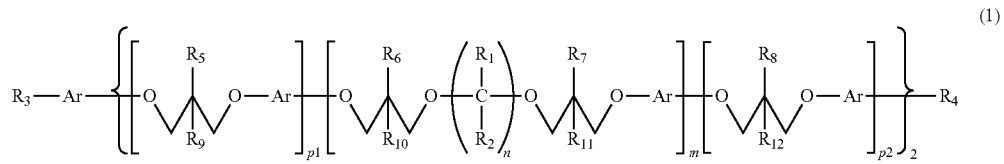

(1)

wherein, in the formula (1), each Ar independently represents a structure having an aromatic ring being unsubstituted or having a substituent,
each of $R_1$ and $R_2$ independently represents a hydrogen atom or an alkyl group having 1 or 2 carbon atoms,
each of $R_3$ to $R_8$ independently represents a hydroxyl group, a glycidyl ether group and/or a 2-methylglycidyl ether group, wherein at least one of $R_3$ to $R_8$ is a glycidyl ether group or a 2-methylglycidyl ether group,
each of $R_9$ to $R_{12}$ independently represents a hydrogen atom or a methyl group,
n is an integer of 11 to 16, and
m, $p_1$, $p_2$, and q are an average of the number of repeating units, and m is 0.5 to 25,
each of $p_1$ and $p_2$ is independently 0 to 5, and
q represents 0.5 to 5,
wherein the individual repeating units present in the repeating units of the structure are the same or different.

* * * * *